(12) United States Patent
Choi et al.

(10) Patent No.: US 11,531,476 B2
(45) Date of Patent: Dec. 20, 2022

(54) MEMORY SYSTEM AND MEMORY SYSTEM DISCARD METHOD

(71) Applicant: SK hynix Inc., Gyeonggi-do (KR)

(72) Inventors: Han Choi, Gyeonggi-do (KR); Dae Hee Kim, Gyeonggi-do (KR); Jae Wan Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/313,685

(22) Filed: May 6, 2021

(65) Prior Publication Data
US 2022/0206692 A1 Jun. 30, 2022

(30) Foreign Application Priority Data
Dec. 24, 2020 (KR) .................. 10-2020-0183202

(51) Int. Cl.
| | |
|---|---|
| *G06F 3/06* | (2006.01) |
| *G06F 12/10* | (2016.01) |
| *G06F 9/4401* | (2018.01) |
| *G06F 21/57* | (2013.01) |
| *G06F 21/79* | (2013.01) |

(52) U.S. Cl.
CPC .......... *G06F 3/0622* (2013.01); *G06F 3/0659* (2013.01); *G06F 3/0673* (2013.01); *G06F 9/4401* (2013.01); *G06F 12/10* (2013.01); *G06F 21/575* (2013.01); *G06F 21/79* (2013.01)

(58) Field of Classification Search
CPC .... G06F 3/0622; G06F 3/0659; G06F 3/0673; G06F 9/4401; G06F 12/10; G06F 21/57; G06F 21/575; G06F 21/79

USPC ........................................................ 711/163
See application file for complete search history.

(56) References Cited

U.S. PATENT DOCUMENTS

| | | | | |
|---|---|---|---|---|
| 11,113,070 | B1 * | 9/2021 | Kulchytskyy | ....... G06F 9/44505 |
| 2003/0056070 | A1 * | 3/2003 | Dayan | ..................... G06F 21/79 711/163 |
| 2007/0174621 | A1 * | 7/2007 | Ducharme | .............. G06F 21/10 713/176 |
| 2007/0290715 | A1 * | 12/2007 | Baer | ....................... G06F 21/71 326/38 |
| 2011/0182101 | A1 * | 7/2011 | Bae | ........................ G11C 17/18 365/163 |

(Continued)

FOREIGN PATENT DOCUMENTS

KR   10-2016-0129924   11/2016

OTHER PUBLICATIONS

Y.-J. Woo and J.-S. Kim, "Diversifying wear index for MLC NAND flash memory to extend the lifetime of SSDs," 2013 Proceedings of the International Conference on Embedded Software (EMSOFT), 2013, pp. 1-10, doi: 10.1109/EMSOFT.2013.6658584. (Year: 2013).*

*Primary Examiner* — Reginald G Bragdon
*Assistant Examiner* — Aaron D Ho
(74) *Attorney, Agent, or Firm* — IP & T Group LLP

(57) ABSTRACT

Disclosed is a memory system including a controller configured to authenticate a user who inputs a request for discarding the memory system, to verify whether the request is valid when the user is authenticated as a legitimate user, to register discard activation of the memory system when the request is valid, and to transmit the request to a memory device; and the memory device configured to determine whether the transmitted request is valid, and to register the discard activation of the memory system when the request is valid.

15 Claims, 13 Drawing Sheets

(56) References Cited

U.S. PATENT DOCUMENTS

| | | | |
|---|---|---|---|
| 2013/0340094 A1* | 12/2013 | Majeti | G06Q 10/109 726/28 |
| 2015/0379306 A1* | 12/2015 | Zimmer | G09C 1/00 713/193 |
| 2016/0344731 A1* | 11/2016 | Serebrin | G06F 12/1475 |
| 2019/0065113 A1* | 2/2019 | Kim | G01C 19/00 |
| 2019/0129638 A1* | 5/2019 | Murali | G06F 3/0679 |
| 2020/0186339 A1* | 6/2020 | Hung | G06F 3/068 |
| 2021/0286692 A1* | 9/2021 | Chien | G06F 9/4416 |

* cited by examiner

MEMORY SYSTEM AND MEMORY SYSTEM DISCARD METHOD

CROSS-REFERENCE TO RELATED APPLICATION

This application claims priority under 35 U.S.C. § 119 to Korean Patent Application No. 10-2020-0183202, filed on Dec. 24, 2020, which is incorporated herein by reference in its entirety.

BACKGROUND

1. Field

One or more embodiments described herein relate to a memory system and a memory system discard method.

2. Discussion of the Related Art

Many portable electronics include a semiconductor memory. Such a memory exhibits excellent stability and durability because it has no mechanical driving parts like hard disk drives (HDDs). Semiconductor memories also consume less power and have higher data access speeds than HDDs. Examples of devices equipped with a semiconductor memory include a USB (Universal Serial Bus) memory device, a memory card having one or more interfaces, and a solid state drive (SSD).

SUMMARY

One or more embodiments described herein provide a method of writing discard activation of a memory system.

One or more embodiments further provide a method of blocking booting of a memory system.

One or more embodiments further provide a method of blocking a read command for a memory system.

One or more embodiments further provide a method of discarding a memory system when a delete command is received after a memory device reaches a predetermined point in time (e.g., the end of its useful life).

One or more embodiments further provide a memory system that implements the aforementioned methods.

In an embodiment of the present disclosure, a memory system may include: a controller configured to authenticate a user who inputs a request for discarding the memory system, to verify whether the request is valid when the user is authenticated as a legitimate user, to register discard activation of the memory system when the request is valid, and to transmit the request to a memory device; and the memory device configured to determine whether the transmitted request is valid, and to register the discard activation of the memory system when the request is valid.

In an embodiment of the present disclosure, a method of discarding a memory system may include: authenticating, by a controller, a user who inputs a request for discarding the memory system; verifying, by the controller, whether the request is valid when the user is authenticated as a legitimate user; registering, by the controller, discard activation of the memory system when the request is valid and transmitting the request to a memory device; and determining, by the memory device, whether the transmitted request is valid; and registering, by the memory device, the discard activation of the memory system when the request is valid.

In an embodiment of the present disclosure, a method of discarding a memory system may include: receiving, by the controller, a delete command for data of the memory device; checking, by the controller, whether the memory device is able to execute the delete command; and registering discard activation of the memory system when the memory device reaches end of life and is not able to execute the delete command.

DETAILED DESCRIPTION

Embodiments of the disclosure will now be described in detail with reference to the accompanying drawings, wherein like numbers reference like elements.

Figure 1:
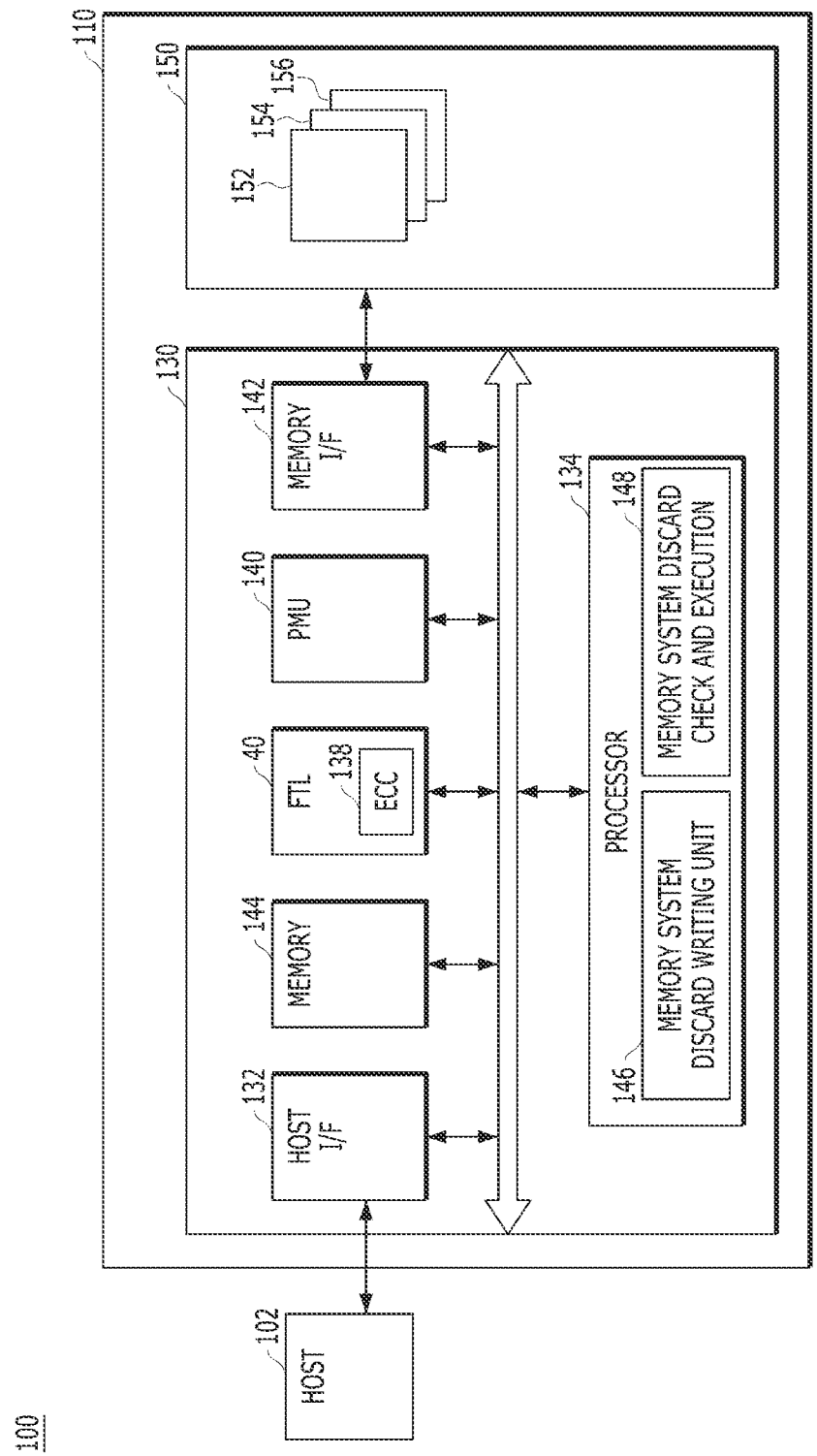
FIG. 1 illustrates an embodiment of a data processing system.

FIG. 1 illustrates an embodiment of a data processing system 100, which may include a host 102 engaged or interlocked with a memory system 110.

The host 102 may include a portable electronic device (e.g., mobile phone, MP3 player, laptop computer, etc.) or an electronic device such as a desktop computer, a game player, a television (TV), a projector and the like.

The host 102 may also include at least one operating system (OS) to manage and control functions and operations of the host 102. For example, the OS can provide interoperability between the host 102 engaged with the memory system 110 and a user of the memory system 110. The OS may support functions and operations corresponding to user requests.

By the way of example but not limitation, the OS can be a general operating system or a mobile operating system, for example, according to mobility of the host 102. The general operating system may be, for example, a personal operating system or an enterprise operating system according to system requirements or a user environment. The personal operating system (e.g., Windows, Chrome, etc.) may be subject to support services for various purposes. The enterprise operating systems can be specialized for securing and supporting high performance, including Windows servers, Linux, Unix and the like.

The mobile operating system may be based on, for example, Android, iOS, Windows mobile, or another system. The mobile operating system may be subject to support services or functions for mobility (e.g., a power saving function). In one embodiment, the host 102 may include a plurality of operating systems, and may execute multiple operating systems interlocked with the memory system 110 based on a user request. The host 102 may transmit a plurality of commands corresponding to the user requests to the memory system 110, to thereby perform operations corresponding to commands within the memory system 110.

The memory system 110 may operate or perform a specific function or operation in response to a request from the host 102, e.g., may store data to be accessed by the host 102. The memory system 110 may be used as a main memory system or an auxiliary memory system of the host 102. The memory system 110 may be implemented with one of various types of storage devices electrically coupled with the host 102 and may communicate therewith according to a protocol of a host interface. Non-limiting examples of the storage device include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device (e.g., dynamic random access memory (DRAM) and static RAM (SRAM)) and/or a nonvolatile memory device (e.g., read only memory (ROM), mask ROM (MROM), programmable ROM (PROM), erasable programmable ROM (EPROM), electrically erasable programmable ROM (EEPROM), ferroelectric RAM (FRAM), phase-change RAM (PRAM), magneto-resistive RAM (MRAM), resistive RAM (RRAM or ReRAM), flash memory, etc.).

The memory system 110 may include a controller 130 and a memory device 150. The memory device 150 may store data to be accessed by the host 102. The controller 130 may control storage of data in the memory device 150.

The controller 130 and memory device 150 may be integrated into a single semiconductor device, which, for example, may be in any of the types of memory systems as exemplified above. By the way of example but not limitation, the controller 130 and the memory device 150 may be integrated into a single semiconductor device. The controller 130 and memory device 150 may be integrated into an SSD for improving operation speed. When the memory system 110 is used as an SSD, the operating speed of the host 102 connected to the memory system 110 can be improved more than that of the host 102 implemented with a hard disk.

In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMCmicro), a SD card (SD, miniSD, microSD, SDHC), a universal flash memory or the like.

The memory system 110 may be configured as part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain the storage of data therein even when electrical power is not supplied. The memory device 150 may store data provided from the host 102 through a write operation and may provide data stored therein to the host 102 through a read operation. The memory device 150 may include a plurality of memory blocks 152, 154, 156, each of which may include a plurality of pages. Each of the pages may include a plurality of memory cells to which word lines (WL) are electrically coupled. The memory device 150 also includes a plurality of memory dies, each of which includes a plurality of planes and each of the planes including a plurality of memory blocks 152, 154, 156. The memory device 150 may be a non-volatile memory device. Examples include a flash memory having a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, to the host 102. The controller 130 may store the data, provided by the host 102, to the memory device 150.

The controller 130 may include a host interface (I/F) 132, a processor 134, a flash translation layer 40, a power management unit (PMU) 140, a memory interface (I/F) 142 and a memory 144, all operatively coupled via an internal bus.

The host interface 132 may process commands and data from the host 102 and may communicate with the host 102 through at least one of various interface protocols. Examples include universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 may exchange data with host 102 based on instructions, e.g., firmware called a host interface layer (HIL).

A flash translation layer (hereinafter, referred to as 'FTL') 40 may control overall operations of the memory system 110. For example, the FTL 40 may receive a read command and a logical address of data corresponding to the read command from the HOST IF 132, and may include a logical to physical (L2P) map for translating the received logical address of the data into a physical address of the memory device 150. The FTL 40 may be firmware executed by processor 134.

The FTL 40 may translate the logical address of the data received from the HOST IF 132 to the physical address of the memory device 150 using the L2P map, and may transfer the physical address of the data to the memory I/F 142.

Furthermore, the FTL 40 may authenticate a user who has requested the memory system 110 to be discarded, verify whether the request of the user for discarding the memory system 110 is valid, and transfer the request for discarding the memory system 110 to a memory system discard writing unit (e.g., discard logic) 146 when the request for discarding the memory system 110 is valid.

The FTL 40 may also include an ECC unit 138, which may correct one or more error bits of data processed in the memory device 150 and which may include an ECC encoder and an ECC decoder. The ECC encoder can perform error correction encoding of data to be programmed in the memory device 150, in order to generate encoded data into which one or more parity bits are added. The encoded data may be stored by the ECC encoder in memory device 150. The ECC decoder can detect and correct errors in data read from the memory device 150 when the controller 130 reads data stored in the memory device 150. For example, after performing error correction decoding on the data read from the memory device 150, the ECC component 138 can determine whether the error correction decoding has succeeded and output an instruction signal (e.g., a correction success signal or a correction fail signal).

The ECC component 138 can use the parity bit, generated during the ECC encoding process, to correct the error bit(s) of the read data. When the number of error bits is greater than or equal to a threshold number of correctable error bits, the ECC component 138 might not correct error bits but instead may output an error correction fail signal indicating failure in correcting the error bits.

The ECC component 138 may perform an error correction operation in various ways, including but not limited to coded modulation. Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and a Block coded modulation (BCM), as well as others. The ECC component 138 may also include various circuits, modules, systems or devices for performing error correction operation based on at least one of the codes.

In present embodiment, the FTL 40 includes the ECC unit 138. In another embodiment, the ECC unit 138 may be implemented as a separate module, circuit, firmware, instructions, or the like in the controller 130.

The PMU 140 may manage electrical power of the controller 130.

The memory interface 142 may serve as an interface for handling commands and data transferred between the controller 130 and the memory device 150, in order to allow the controller 130 to control the memory device 150 in response to a request from the host 102. The memory interface 142 may generate a control signal for the memory device 150 and may process data entered into or outputted from the memory device 150 under the control of the processor 134 when the memory device 150 is a flash memory, including but not limited to a NAND flash memory. The memory interface 142 can serve an interface for handling commands and data between the controller 130 and the memory device 150. For example, the memory interface 142 may serve as a NAND flash interface for purposes of handling operations between the controller 130 and the memory device 150. In an embodiment, the memory interface 142 can be implemented through firmware (e.g., Flash Interface Layer (FIL)), which serves as a component to exchange data with memory device 150.

The memory 144 may support operations performed by the memory system 110 and the controller 130. The memory 144 may store temporary or transactional data relating to or delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 within the memory device 150. The memory 144 may be used to store data for the controller 130 and the memory device 150 to perform operations such as read operations or program/write operations.

Figure 2:
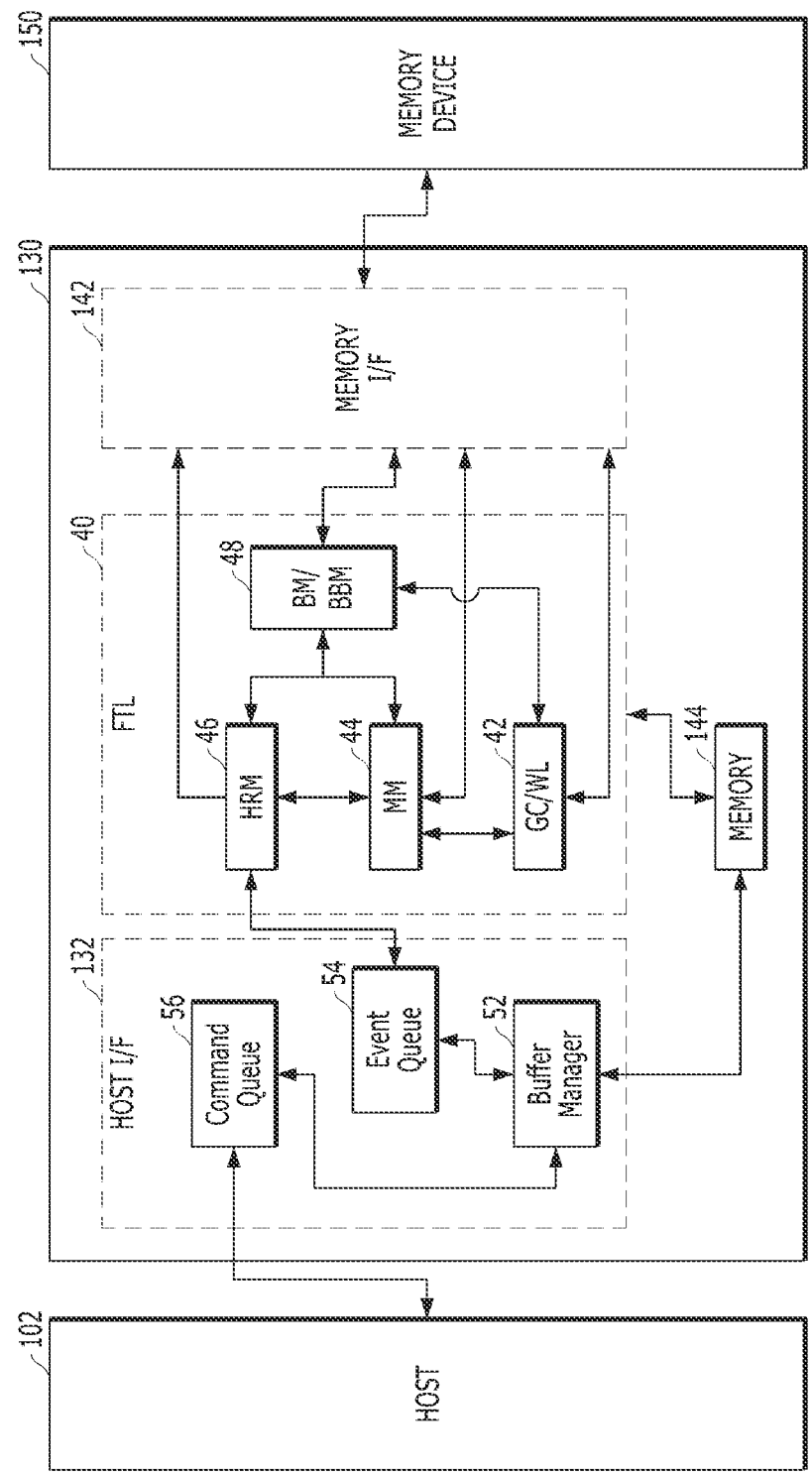
FIG. 2 illustrates an embodiment of a memory system controller.

The memory 144 may be implemented with a volatile memory, e.g., a static random access memory (SRAM), a dynamic random access memory (DRAM), or both. In FIG. 2, the second memory 144 is disposed within the controller 130. In one embodiment, the memory 144 may be external and coupled to the controller 130. For instance, the memory 144 may be embodied as an external volatile memory having a memory interface that transfers data and/or signals between the memory 144 and the controller 130.

The memory 144 can store data for performing operations such as data writing and data reading requested by the host 102, and/or data transfer between the memory device 150 and the controller 130 for background operations such as garbage collection and wear levelling. In accordance with an embodiment, to support operations in the memory system 110, the memory 144 may include one or more of a program memory, a data memory, a write buffer/cache, a read buffer/cache, a data buffer/cache, a map buffer/cache, or the like.

The processor 134 may be implemented, for example, with a microprocessor or a central processing unit (CPU). In one embodiment, the memory system 110 may include one or more processors 134. The processor 134 may control overall operation of the memory system 110. By way of example but not limitation, the processor 134 can control a program operation or a read operation of the memory device 150, in response to a write request or a read request entered from the host 102. In accordance with an embodiment, the processor 134 may use or execute instructions (e.g., firmware) to control overall operation of the memory system 110. In one embodiment, firmware may refer to a flash translation layer (FTL). The FTL may operate as an interface between the host 102 and the memory device 150. The host 102 may transmit requests for write and read operations to the memory device 150 through the FTL.

The processor 134 may include the memory system discard writing unit (or logic) 146 and a memory system discard check and execution unit (or logic) 148.

The memory system discard writing unit 146 may write (i.e., register), in the controller 130, information indicating that discard of the memory system 110 has been activated. This writing operation may be performed, for example, according to a request for discarding the memory system 110 transferred to the memory device 150.

Furthermore, the memory system discard check and execution unit 148 may check whether discard of the memory system 110 has been activated, and may block booting of the memory system 110 or block a read command for the memory system 110 when discard of the memory system 110 has been activated. Embodiments relating to these operations of the memory system discard writing unit 146 and memory system discard check and execution unit 148 are described below.

For example, the controller 130 may use the processor 134 (e.g., implemented as a microprocessor or central processing unit (CPU)) to perform operations requested from the host 102 in the memory device 150. The processor 134 may engage with the memory device 150 to handle instructions or commands corresponding to commands from the host 102. For example, the controller 130 can perform a foreground operation as a command operation corresponding to a command from the host 102. Examples of the command include a program operation corresponding to a write command, a read operation corresponding to a read command, an erase/discard operation corresponding to an erase/discard command, and a parameter set operation corresponding to a set parameter command or a set feature command with a set command.

In one embodiment, the controller 130 may perform a background operation on the memory device 150 through the processor 134. By way of example but not limitation, the background operation for the memory device 150 includes an operation of copying and storing data stored in a memory block (among memory blocks 152, 154, 156 in the memory device 150) to another memory block, e.g., a garbage collection (GC) operation. The background operation can include an operation of moving or swapping data stored in at least one of the memory blocks 152, 154, 156 to at least another one of the memory blocks 152, 154, 156, e.g., a wear leveling (WL) operation.

During a background operation, the controller 130 may use the processor 134 to store the map data (stored in the controller 130) to at least one of the memory blocks 152, 154, 156 in the memory device 150, e.g., a map flush operation. A bad block management operation of checking or searching for bad blocks among the memory blocks 152, 154, 156 is another example of a background operation that may be performed by the processor 134.

In memory system 110, controller 130 may perform a plurality of command operations corresponding to commands entered from the host 102. For example, when performing program operations corresponding to program commands, read operations corresponding to read commands and erase operations corresponding to erase commands sequentially, randomly or alternatively, the controller 130 can determine which channel(s) or way(s) is/are proper or appropriate for performing each operation. The channel (s) or way(s) may be ones that connect, for example, the controller 130 to a plurality of memory dies in the memory 150.

The controller 130 can send or transmit data or instructions, via determined channels or ways, for performing each operation. The memory dies in the memory 150 can transmit operation results, via the same channels or ways, after respective operations are completed. Then, the controller 130 may transmit a response or an acknowledge signal to the host 102. In an embodiment, the controller 130 can check a status of each channel or each way. In response to a command from the host 102, the controller 130 may select at least one channel or way based on the status of each channel or way, so that instructions and/or operation results with data may be delivered via the selected channel(s) or way(s).

By the way of example but not limitation, the controller 130 can recognize statuses regarding channels (or ways) associated with memory dies in the memory device 150. For example, the controller 130 may determine the state of each channel or each way as a busy state, a ready state, an active state, an idle state, a normal state or an abnormal state, or various combinations thereof. The determination of which channel or way an instruction (and/or a data) is delivered through by the controller can be associated with a physical block address, e.g., to which die(s) the instruction (and/or the data) is delivered.

In one embodiment, the controller 130 can refer to descriptors delivered from the memory device 150. The descriptors can include, for example, a block or page of one or more parameters that describe a feature relating to the memory device 150 storing data having a predetermined format or structure. The descriptors may include, for example, device descriptors, configuration descriptors, unit descriptors, or another type of descriptor. The controller 130 can refer to, or use, the descriptors to determine which channel(s) or way(s) an instruction or a data is exchanged via.

The memory system 110 may store data using the memory device 150 and may protect user data through various methods, e.g., data encryption or user authentication. Such data protection may be performed not only when the memory system 110 is used, but also when the memory system 110 is discarded. When the memory system 110 is discarded, data leakage may be substantially prevented by physically removing data of the memory device 150 or by discarding an encryption key used for encryption when data has been encrypted.

However, the method of physically removing data of the memory device may make recovery impossible in some cases. Also, this technique takes a significant amount of time to implement, a method of encrypting data of the memory system 110 and removing an encryption key used for encryption is preferred.

However, the encryption key may be leaked in advance or publicly disclosed. Also, when data may not be able to be written in or erased from the memory device 150, the encryption key can not be removed. In the two cases, the data may be directly extracted from the memory device 150. Furthermore, even when the encryption key has been discarded, there is a risk that data in the memory device 150 may be leaked, for example, by directly accessing the I/O of the memory device 150 and indiscriminately inserting the encryption key.

FIG. 2 is a diagram of an embodiment of controller 130, which may include a host interface 132, a flash translation layer (FTL) 40.

The host interface 132 may handle commands, data, and other information transmitted from the host 102. By way of example but not limitation, the host interface 132 may include a command queue 56, a buffer manager 52 and an event queue 54. The command queue 56 may sequentially store commands, data, and other information from the host 102, and may output them to the buffer manager 52, for example, in an order in which they are stored. The buffer manager 52 may classify, manage or adjust the commands, data or other information received from the command queue 56. The event queue 54 may sequentially transmit events for processing the commands, data, and other information from the buffer manager 52.

A plurality of commands or data of the same characteristic (e.g., read or write commands) may be transmitted from the host 102, or commands and data of different characteristics may be transmitted to the memory system 110 after being mixed or jumbled by the host 102. For example, commands for reading data (read commands) may be delivered, or commands for reading data (read command) and programming/writing data (write command) may be alternately transmitted to the memory system 110.

The host interface 132 may store commands, data, and the like, transmitted from the host 102 to the command queue 56 in a predetermined manner, e.g., sequentially or in another order. Thereafter, the host interface 132 may estimate or predict what kind of internal operation the controller 130 will perform according to one or more characteristics of commands, data, and/or the like entered from the host 102. The host interface 132 can determine a processing order and a priority of commands, data and/or other information based at least on the one or more characteristics.

Based on the one or more characteristics of commands, data, and/or other information transmitted from the host 102, the buffer manager 52 in the host interface 132 may determine whether the buffer manager should store commands, data, and/or the other information in the memory 144, or whether the buffer manager should deliver the commands, data, and/or other information to the flash translation layer (FTL) 40.

The event queue 54 receives events from the buffer manager 52, which events are to be internally executed and processed by the memory system 110 or controller 130 in response to the commands, data, and/or other information transmitted from the host 102, and may then deliver the events to the flash translation layer (FTL) 40 in a predetermined order, e.g., in the order received or in another order.

In accordance with an embodiment, the host interface 132 described in FIG. 2 may perform some functions of the controller 130 described in FIG. 1.

In accordance with an embodiment, the flash translation layer (FTL) 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By way of example but not limitation, the host request manager (HRM) 46 can use the map manager (MM) 44 and the block manager 48 to handle or process requests according to the read and program commands and events delivered from the host interface 132. The host request manager (HRM) 46 can send an inquiry request to map data manager (MM) 44 to determine a physical address corresponding to the logical address entered with the events. The host request manager (HRM) 46 can send a read request with the physical address to the memory interface 142, to process the read request (handle the events).

On the other hand, the host request manager (HRM) 46 can send a program request (write request) to the block manager 48, to program data to a specific empty page (no data) in the memory device 150, and then can transmit a map update request corresponding to the program request to the map manager (MM) 44. The map update request may be to update an item relevant to the programmed data in information of mapping the logical-physical addresses to each other.

The block manager 48 can convert a program request, delivered from the host request manager (HRM) 46, the map data manager (MM) 44 and/or the state manager 42, to a flash program request for the memory device 150 in order to manage flash blocks in the memory device 150. To maximize or enhance program or write performance of the memory system 110 (e.g., see FIG. 2), block manager 48 may collect program requests and send flash program requests for multiple-plane and one-shot program operations to the memory interface 142. In an embodiment, the block manager 48 sends several flash program requests to the memory interface 142, for example, in order to enhance or maximize parallel processing of the multi-channel and multi-directional flash controller.

In one embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed.

The state manager 42 can perform garbage collection to move the valid data to an empty block and erase the blocks containing the moved valid data, so that the block manager 48 may have enough free blocks (e.g., empty blocks with no data). If the block manager 48 provides information regarding a block to be erased to the state manager 42, the state manager 42 ma check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 may send a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in map manager 44 exceeds a certain threshold, a program request can be sent to block manager 48 so that a clean cache block is made and the dirty map table may be stored in the memory device 150.

When garbage collection is performed, the state manager 42 may copy valid page(s) to a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. This is because the map request may be issued with old physical information when the status manger 42 requests a map update and a valid page copy is completed later. In one embodiment, the map manager 44 may perform a map update operation to ensure accuracy only when the latest map table still points to the old physical address.

In accordance with an embodiment, at least one of the state manager 42, the map manager 44 or the block manager 48 can include circuitry for performing its own operation. Such circuitry may correspond to any of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. These types of circuitry may apply to all uses of this term in this application, including in any claims. As a further example, the circuitry may also cover an implementation of merely a processor (or multiple processors) or portion of a processor and its (or their) accompanying software, instructions, and/or firmware that is to be executed. The circuitry may also cover, for example, and if applicable to a particular claim element, an integrated circuit for a storage device.

The memory device 150 can include a plurality of memory blocks. The memory blocks can be any of different types of memory blocks, e.g., a single-level cell (SLC) memory block, a multi-level cell (MLC) memory block or another type of memory block determined according to the number of bits that can be stored or represented in one memory cell. For example, an SLC memory block may include a plurality of pages implemented by memory cells, each storing one bit of data. An SLC memory block can also have high data I/O operation performance and high durability. An MLC memory block may include a plurality of pages implemented by memory cells, each storing multi-bit data (e.g., two bits or more). An MLC memory block can have larger storage capacity for the same space compared to the SLC memory block. Also, an MLC memory block can be highly integrated in a view of storage capacity.

In an embodiment, the memory device 150 may be implemented with MLC memory blocks such as an MLC memory block, a triple-level cell (TLC) memory block, a quadruple-level cell (QLC) memory block, or a combination thereof. The MLC memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In one embodiment, the memory device 150 can be implemented with a block including a plurality of pages implemented by memory cells, each capable of storing 5-bit or more bit data.

In an embodiment, the memory device 150 is embodied as a nonvolatile memory, e.g., a flash memory such as a NAND flash memory or a NOR flash memory. In one embodiment, the memory device 150 may be implemented by at least one of a phase change random access memory (PCRAM), a ferroelectrics random access memory (FRAM), a spin injection magnetic memory (STT-RAM), or a spin transfer torque magnetic random access memory (STT-MRAM).

Embodiments of a memory device in a memory system are described with reference to FIGS. 3 to 5.

Figure 3:
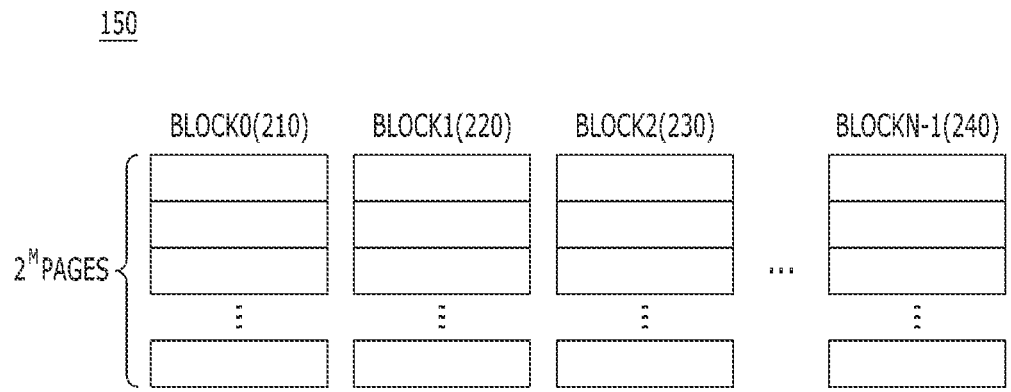
FIG. 3 illustrates an embodiment of a memory device.

FIG. 3 is a schematic diagram illustrating an embodiment of a memory device, e.g., memory device 150. FIG. 4 is a circuit diagram illustrating an embodiment of a memory cell array of a memory block 330 in memory device 150. FIG. 5 is a schematic diagram illustrating an embodiment of a 3D structure of memory device 150.

Referring to FIG. 3, the memory device 150 may include a plurality of memory blocks BLOCK0 (210) to BLOCKN-1 (240), where N is an integer greater than 1. Each of the blocks BLOCK0 to BLOCKN-1 may include a plurality of pages (e.g., $2^M$ or M pages), the number of which may vary according to circuit design, and where M is an integer greater than 1. Each of the pages may include a plurality of memory cells coupled to a plurality of word lines WL.

Also, memory cells in the respective memory blocks BLOCK0 to BLOCKN-1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages embodied by memory cells, each storing one-bit data. The SLC memory blocks may generally have higher data computing performance and higher durability than MLC memory blocks.

The MLC memory blocks may include a plurality of pages embodied by memory cells, each storing multi-bit data (for example, 2 or more bits). The MLC memory blocks may generally have larger data storage space (e.g., higher integration density) than the SLC memory blocks. In one embodiment, the memory device 150 may include a plurality of triple level cell (TLC) memory blocks. In one embodiment, the memory device 150 may include a plurality of quadruple level cell (QLC) memory blocks. The TLC memory blocks may include a plurality of pages embodied by memory cells, each capable of storing 3-bit data. The QLC memory blocks may include a plurality of pages embodied by memory cells, each capable of storing 4-bit data.

The memory device 150 may store a larger amount of data in an MLC memory block than the SLC memory block. However, when the SLC memory block is used, the memory device 150 may process data faster than when the MLC memory block is used. For example, an SLC memory block and an MLC memory block may have different advantages and disadvantages. Therefore, when data is to be rapidly processed, the processor 134 may control the memory device 150 to program data to the SLC memory block. When a large storage space is needed, the processor 134 may control the memory device 150 to program data to the MLC memory block. As a result, the processor 134 may decide the type of a memory block in which data are to be stored, depending on situations.

Instead of a nonvolatile memory, the memory device 150 may be implemented, for example, by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 4:
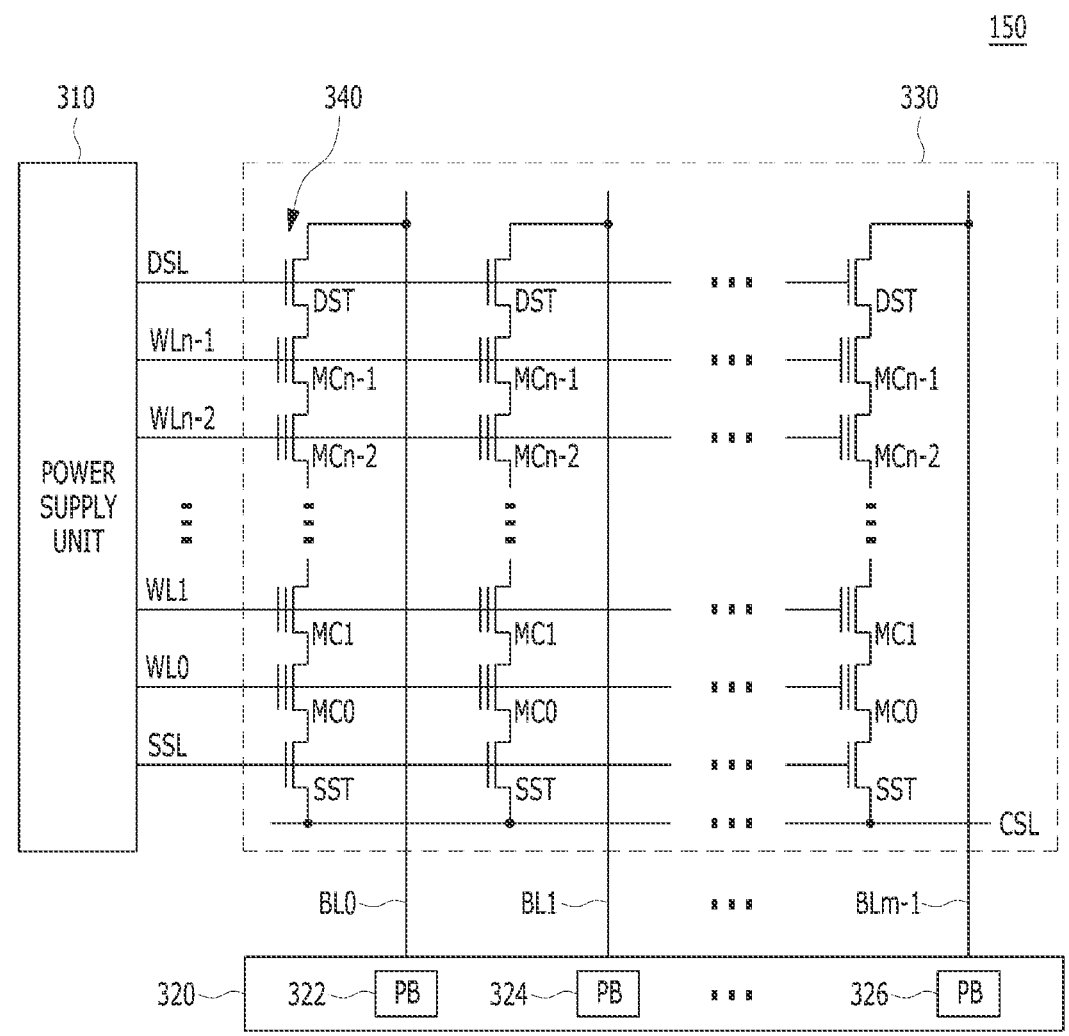
FIG. 4 illustrates an embodiment of a memory cell array.

Referring to FIG. 4, the memory blocks in the memory device 150 of the memory system 110 may include a plurality of cell strings 340, which are implemented as a memory cell array 330 coupled to bit lines BL0 to BLm-1, respectively. The cell string 340 of each column may include one or more drain select transistors DST and one or more source select transistors SST. A plurality of memory cells MC0 to MCn-1 may be coupled in series between the drain and source select transistors DST and SST. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm−1.

In the embodiment of FIG. 4, memory cell array 330 includes NAND flash memory cells. However, the memory blocks in memory device 150 may be implemented as a NOR-type flash memory, a hybrid flash memory (in which two or more types of memory cells are mixed), a one-NAND flash memory (having a controller embedded in a memory chip), or another type of memory.

The voltage supply circuit 310 of the memory device 150 may provide word line voltages (e.g., program voltage, read voltage, pass voltage) to respective word lines, and a voltage to be supplied to a bulk (for example, a well region) in which memory cells are formed, depending on operation modes. At this time, a voltage generation operation of the voltage supply circuit 310 may be performed under control of a control circuit. Furthermore, the voltage supply circuit 310 may generate a plurality of variable read voltages in order to generate a plurality of read data, to select one of the memory blocks (or sectors) of the memory cell array, and to select one of the word lines of the selected memory block in response to control of the control circuit and provide word line voltages to the selected word line and the unselected word lines, respectively.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive from a buffer data to be stored to the memory cell array and drive bit lines according to the received data. The read/write circuit 320 may include a plurality of page buffers 322 to 326 respectively corresponding to columns (or bit lines) or column pairs (or bit line pairs). Each of the page buffers 322 to 326 may include, for example, one or more latches.

The memory device 150 may be implemented as a two-dimensional or three-dimensional memory device. For example, as illustrated in FIG. 5, the memory device 150 may be implemented as a nonvolatile memory device with a three-dimensional stack structure. In this case, the memory device 150 may include a plurality of memory blocks BLK0 to BLKN−1.

Figure 5:
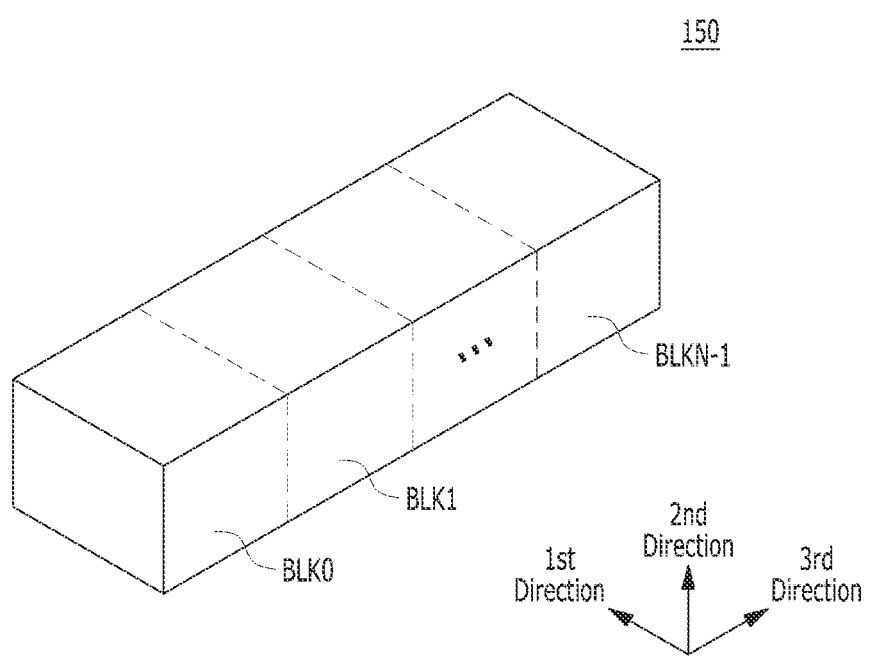
FIG. 5 illustrates an embodiment of a memory device.

FIG. 5 is a block diagram illustrating an embodiment of memory blocks of memory device 150. Each of the memory blocks may have a three-dimensional structure (or vertical structure). For example, each of the memory blocks may have features extending in first to third directions (e.g., x-axis direction, y-axis direction, z-axis direction) to form a three-dimensional structure.

Each memory block 330 in the memory device 150 may include, for example, a plurality of NAND strings NS extending in the second direction and a plurality of NAND strings NS extending in the first and third directions. Each of the NAND strings NS may be coupled to a bit line BL, at least one string selection line SSL, at least one ground selection line GSL, a plurality of word lines WL, at least one dummy word line DWL, and a common source line CSL. Also, each of the NAND strings NS may include a plurality of transistor structures TS.

In one embodiment, each of the memory cell arrays 330 in the memory blocks of memory device 150 may be coupled to bit lines BL, select lines SSL, ground select lines GSL, word lines WL, dummy word lines DWL, and common source lines CSL, and thus may include a plurality of NAND strings NS.

In each of the memory cell arrays 330, a plurality of NAND strings NS may be coupled to one bit line BL, such that a plurality of transistors can be implemented in one NAND string NS. Furthermore, the string select transistors SST of the respective NAND strings NS may be coupled to the corresponding bit line BL, and the ground select transistors GST of the respective NAND strings NS may be coupled to the common source line CSL. The memory cells MC may be provided between the string select transistors SST and the ground select transistors GST of the respective NAND strings NS. Thus, the memory cells may be implemented in each of the memory cell arrays 330 in the plurality of memory blocks of the memory device 150.

Figure 6:
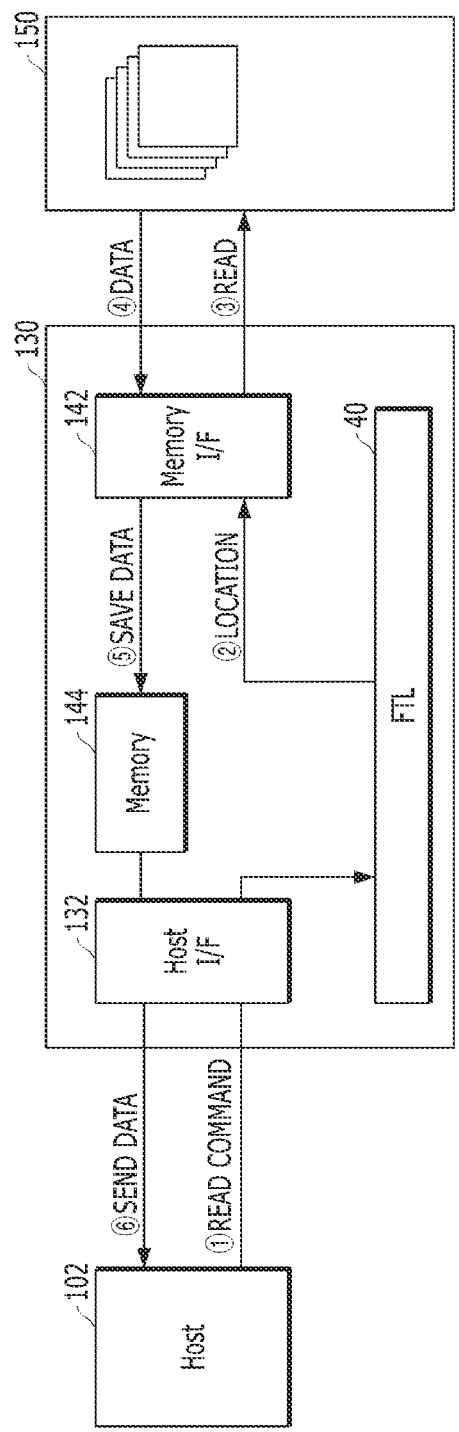
FIG. 6 illustrates an embodiment of a method of controlling a memory system.

FIG. 6 is a diagram illustrating an embodiment of a method of controlling a read operation of the memory system 110.

Referring to FIGS. 2 and 6, the HOST 102 may provide the controller 130 with a read command READ Command and a logical address of data corresponding to the read command through the HOST I/F 132. The HOST I/F 132 may transfer the received read command and logical address of the data corresponding to the read command for the FTL 40 (operation 1).

The FTL 40 may translate the logical address of the data to a physical address of the memory device 150 (which corresponds to the logical address of the data) using the logical to physical (L2P) map, and may transfer the logical address of the data to the MEMORY I/F 142 of the controller 130 (operation 2).

Then, the processor 134 may request the memory device 150 to read data corresponding to the physical address through the MEMORY I/F 142 (operation 3).

The memory device 150 may read data stored in a location corresponding to the physical address and may transfer the read data to the memory I/F 142 (operation 4). Then, the processor 134 may store the data received through memory I/F 142 in memory 144 of the controller 130 (operation 5). The data stored in MEMORY 144 by the processor 134 may be transferred to the host 102 through the host I/F 132 (operation 6).

A user activates a function of discarding the memory system 110, and then substantially prevents the booting itself of the memory system 110 from being performed or each step for the aforementioned data read command from being performed. As a result, blocking data extraction may fundamentally be performed and data recovery may be substantially prevented.

When the request for discarding the memory system 110 is received from a user, FTL 40 may check the discard authority of the user requesting the memory system 110 to be discarded. When the user is determined to be a legitimate user, FTL 40 may request the memory system discard writing unit 146 to discard the memory system 110. The check for the discard authority of the user may include user authentication and a check of the validity of the request for discarding the memory system 110. In accordance with one embodiment, the host IF 132 may check the discard authority of the user having requested the memory system 110 to be discarded. When the user is determined to be a legitimate user, host IF 132 may request the memory system discard writing unit 146 or FTL 40 to discard the memory system 110. In this case, host IF 132 may only perform user authentication.

In one embodiment, the user may request to discard the memory system 110 using a predetermined method. The predetermined method may indicate, for example, an authentication method used in the user authentication and/or which command to use. When the request for discarding the memory system 110 is approved, it may not be possible to cancel the request in some circumstances.

Therefore, in one embodiment, approval of the discard request may be obtained based on two factors: (1) authentication of the user who requested the discard and (2) verification of the validity of the discard request.

User authentication may be performed in various ways based on various type of authentication information, in order to authenticate the authority of the user to discard the memory system 110. For example, memory system 110 may receive a password, a pattern, a cellphone number, a resident registration number, a credit card number, and/or other information from the user at a predetermined time (e.g., time of initial booting or at the time of initial execution of a management program after the memory system 110 is purchased). In one embodiment, user authentication may be performed based on fingerprint, iris, facial recognition, or some other biometric information. The resultant data may be stored in the memory system 110. In other embodiments, user authentication may be performed based on a public or private certificate and/or other encrypted information. In one embodiment, the memory system 110 may receive a serial number or a key provided by a manufacturer or a vendor, encrypt the received serial number or key, and then store the encrypted serial number or key for user authentication.

In one embodiment, user authentication may be performed based on whether the aforementioned information (e.g., password, the pattern, the cellphone number, the resident registration number, the credit card number, the fingerprint, the iris, the facial recognition, or the public certificate stored by the user) matches data input by the user and/or the serial number or the key provided by the manufacturer or the vendor.

In one embodiment, when the user requests the memory system 110 to be discarded on the host 102, the host 102 may inquire of the user about the serial number of the memory system 110, which is provided by the manufacturer or the vendor. Then, when the user responds to the inquiry, host 102 may encrypt the response of the user and transmit the encrypted response to the FTL 40 through host IF 132. The FTL 40 may authenticate the user by checking whether the identification information (e.g., serial number) of memory system 110, which is provided by the manufacturer or the vendor, matches the serial number answered by the user. In accordance with one embodiment, host IF 132 may authenticate the user by receiving the serial numbers and checking whether the serial numbers match each other.

The FTL 40 may verify validity of the discard request using the aforementioned authentication method again after user authentication is completed. For example, the authentication information (e.g., password, pattern, mobile phone number, resident registration number, credit card number, fingerprint, iris, facial recognition, or public certificate stored by the user or the identification information (e.g., serial number or key) provided by the manufacturer or vendor) may be used again when validity of the discard request is verified.

In one embodiment, the FTL 40 may use one or more methods different from the method used to perform user authentication in order to verify the validity of a discard request. For example, when a password is used for user authentication, the validity of the discard request may be verified by inputting a serial number.

When an authenticated user makes a valid discard request, the FTL 40 may request the memory system discard writing unit 146 to discard the memory system 110. When the discard request is received from the FTL 40, the memory system discard writing unit 146 may burn an electronic fuse (e.g., an e-fuse) and write (i.e., register) that a function of discarding the memory system 110 has been activated. In one embodiment, an e-fuse may refer to a technology for reprogramming a chip in real time in a way that is not recoverable after it is burned once and reprogrammed. In such a situation, recovery of the discard request may not be possible. In this regard, the memory system discard check and execution unit 148 may check whether the e-fuse has been burned and determine whether a data read command has been cancelled after the function of discarding the memory system 110 is activated. However, this is only one embodiment. Other devices or methods different from use of an e-fuse may be used, including ones where cancellation or recovery is not possible.

When an e-fuse is burned and the discard function is activated, the memory system discard check and execution unit 148 may cancel or ignore one or more of the aforementioned six operations, even though a read command is provided from the host 102. In such a case, no data may be transferred to the host 102 or arbitrary data may be transmitted as a response. Here, it may be most reliable to cancel the operation of transferring a command to the FTL 40.

For example, the aforementioned operations 2 and 3 involve transferring the physical address to the controller 130 or the memory device 150 after the physical address of the data is completely searched. In this case, the physical address of the data may be exposed. Operations 4 and step 5 may involve the memory device 150 transmitting data searched through the physical address to the controller 130 or the controller 130 may store data received from the memory device 150. In this case, the data may be exposed outside the controller 130. Operation 6 may involve memory 144 transmitting, to the host 102, the data received from the memory device 150 for storing in memory 144. Thus, in operations other than operation 1, there may be a risk of exposing the physical address of the data or the data itself.

In one embodiment, when the function of discarding the memory system 110 is activated, the controller 130 may block use of the memory system 110 by controlling booting of the memory system 110. In such a case, all commands for the memory system 110 (e.g., which include a command for collecting information on the memory system 110) may be fundamentally blocked.

Additionally, because the memory device 150 may be used separately from the memory system 110, there is a risk of data leakage. Therefore, the memory device 150 may also write (i.e., register) whether the discard function has been activated. To this end, the memory device 150 itself may again verify the validity of the discard request of the FTL 40.

For example, FTL 40 may transmit the request for discarding the memory system 110 to the memory device 150, and the memory device 150 may verify the validity of the discard request using the method used in the FTL 40 described above. When the request for discarding the memory system 110 is valid, the memory device 150 may write the discard activation.

In such a case, in order to substantially prevent recovery of the discard activation, the memory device 150 may register the discard activation using the one-time programmable (OTP) MEMORY 144 (e.g., a register) which is writable only once and then is not modifiable.

After the discard activation of the memory system 110 is written in the memory device 150, the memory device 150 may ignore and/or cancel operation 3 (in which controller 130 requests the memory device 150 to read the data corresponding to the physical address), or may transmit arbitrary data instead of correct data in operation 4 of reading the data corresponding to the physical address and transferring the read data to the controller 130.

Figure 7:
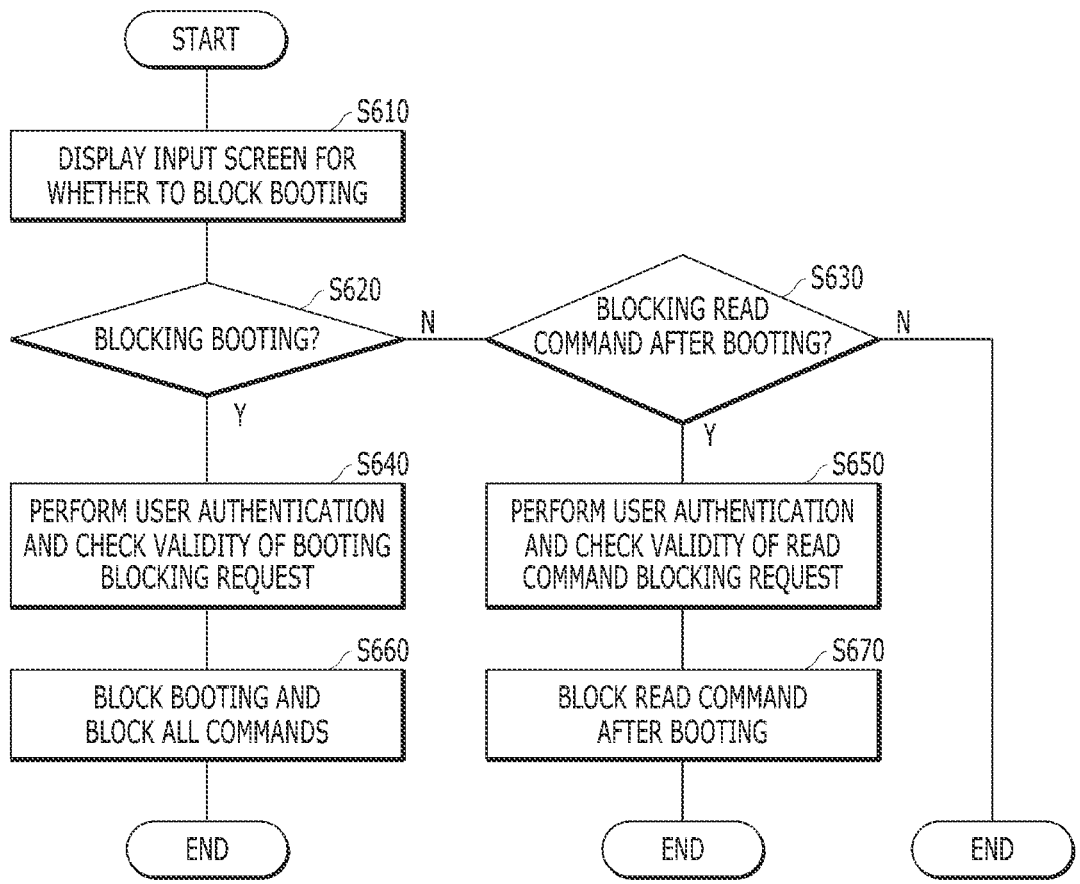
FIG. 7 illustrates an embodiment of a method of discarding a memory system.

FIG. 7 is a flowchart illustrating an embodiment of a method of discarding the memory system 110. Referring to FIG. 7, the method includes, at S610, the host 102 may display an input screen for whether to block booting of the memory system 110. The host 102 may display the input screen, for example, by executing an application program and/or other instructions (e.g., firmware) stored in memory system 110.

The input screen may be displayed, for example, when a management program for the memory system 110 is executed as one function thereof, or when a program for discarding the memory system 110 (e.g., which is stored independently from the memory management program) is executed. In this case, the input screen may display an inquiry about whether to permanently block booting of the memory system 110 and to block a read command after booting.

In S620, the host 102 may receive from the user information indicating whether to block booting of the memory system 110. When the user selects blocking booting of the memory system 110 (e.g., Y in S620), the host 102 proceeds to S640 to perform user authentication and to check validity of the request for blocking booting of the memory system 110.

When the user does not select blocking booting of the memory system 110 (e.g., N in S620), the host 102 may receive information whether to block the read command after booting in S630. When the user selects blocking the read command after booting (e.g., Y in S630), the host 102 may perform user authentication and check validity of the request for blocking the read command after booting in S650. The user authentication and check for the validity of the request for blocking system booting and the request for blocking the read command after booting in S640 and S650 may be performed in the memory system 110. Embodiments will be described with reference to FIG. 8.

In one embodiment, inquiries on whether to block booting and block the read command after booting are displayed on the host 102 in a sequential manner (either on the same screen or in separate screens). In one embodiment, inquiries on whether to block booting and block the read command after booting may be displayed on one screen at the same time.

After the user is authenticated and validity of the request is checked in S640, commands for system booting and memory system 110 may be blocked, in S660.

Similarly, after the user is authenticated and validity of the request is checked in S650, the read command after booting may be blocked, in S670. Blocking the read command may include, for example, cancelling the read command, not responding to the read command, or transmitting arbitrary data in response to the read command.

Figure 8:
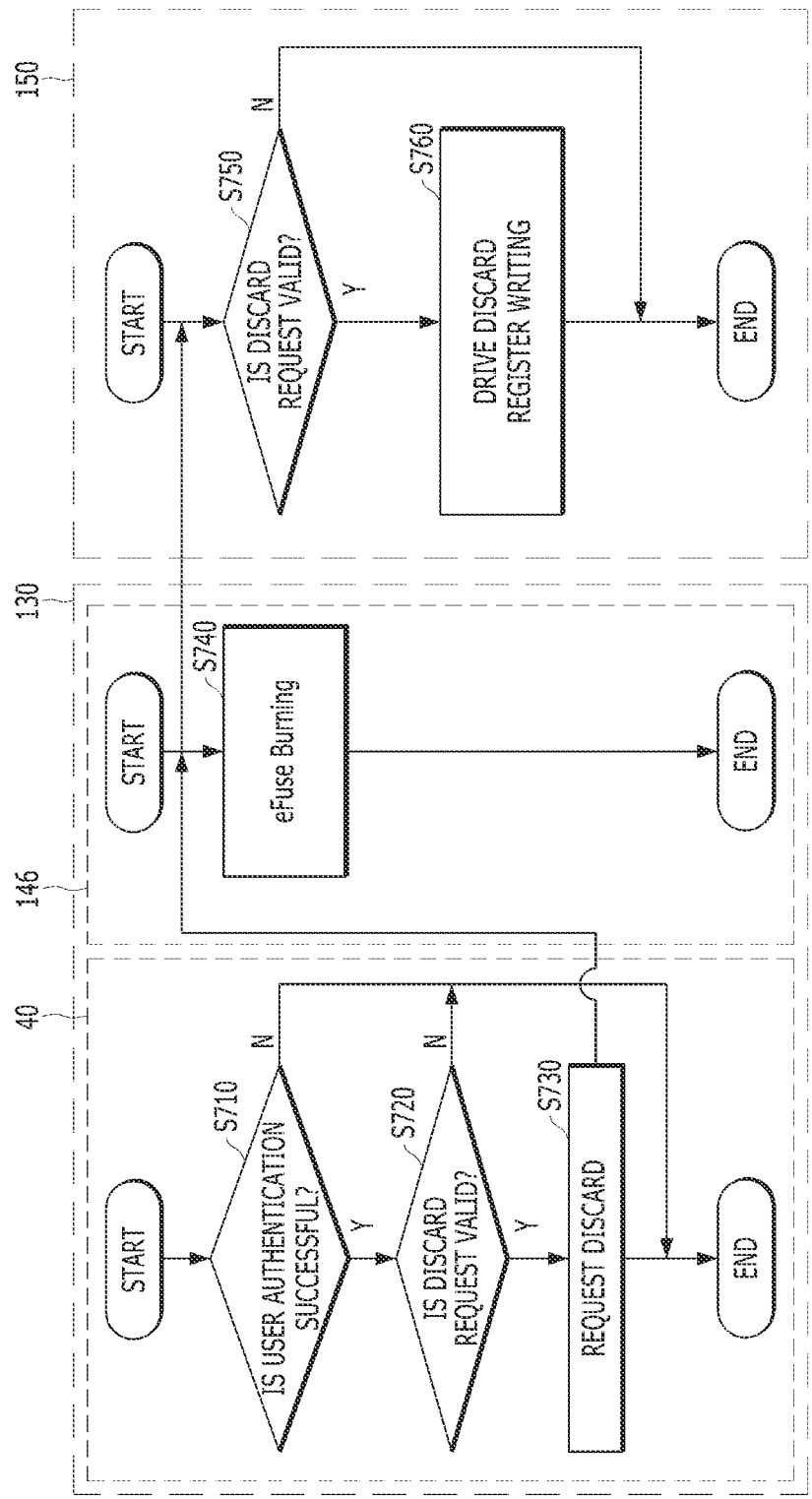
FIG. 8 illustrates an embodiment to perform user authentication and a check for validity of a request for discarding the memory system.

FIG. 8 is a flowchart illustrating an embodiment of a method for performing user authentication and checking the validity of the request for discarding the memory system 110. The request for discarding the memory system 110 may include a booting blocking command or a read command blocking command. In FIG. 8, examples are given of operation S640 of performing user authentication and checking the validity of the booting blocking request or operation S650 of performing the user authentication and checking the validity of the read command blocking request.

In S710, FTL 40 may perform user authentication on the request for discarding the memory system 110. The request may be received through the host IF 132. User authentication may be performed based on whether identification information (e.g., password, pattern, mobile phone number, resident registration number, credit card number, fingerprint, iris scan, facial recognition, public certificate, etc.) stored by the user matches data input by the user and identification information (e.g., serial number or key) provided by the manufacturer or the vendor.

As described above, when the user requests the memory system 110 to be discarded on the HOST 102, the HOST 102 may inquire of the user about the serial number of the memory system 110, which is provided by the manufacturer or the vendor. Then, when the user responds to the inquiry, the host 102 may encrypt the response of the user and transmit the encrypted response to the FTL 40 through the host IF 132. The FTL 40 may authenticate the user by checking whether the identification information (e.g., serial number) of the memory system 110 (e.g., provided by the manufacturer or vendor) matches the identification information (e.g., serial number) answered by the user. Authentication may be performed in a different manner in another embodiment.

When the authentication is successful (e.g., Y in S710), FTL 40 may verify whether the discard request is valid in S720. When authentication fails (e.g., N in S710), FTL 40 may terminate the request for discarding the memory system 110.

The FTL 40 may verify the validity of the discard request (e.g., using the same method described above for user authentication or using a different method) after the user authentication is completed. In one embodiment, verification of the validity of the discard request may be the last operation performed before memory system 110 is discarded. When the memory system 110 is discarded, recovery may not be possible. Thus, in one embodiment, a verification method for stabilizing the procedure may be used. For example, identification information (e.g., password, pattern, mobile phone number, resident registration number, credit card number, fingerprint, iris scan, facial recognition, public or private certificate, etc.) stored by the user, and/or identification information (e.g., serial number or key) provided by the manufacturer or vendor, may be used again in order to verify validity of the discard request. In one embodiment, the FTL 40 may use a method different from that used in the user authentication. For example, when a password is used to perform user authentication, validity of the discard request may be verified based on a serial number input to the memory system 110.

In one embodiment, the host 102 may receive a one-time password from the user, display a combination of numbers, characters, and/or special characters, or allow the user to input them. Furthermore, the host 102 may transmit the one-time password or the combination of the numbers and/or characters received from the user and/or the special characters to the host IF 132 or FTL 40. The host IF 132 or FTL 40 may then check validity of the discard request by determining whether a match is made.

When the discard request is valid (e.g., Y in S720), FTL 40 may transmit the request for discarding the memory system 110 to the memory system discard writing unit 146 and memory device 150, in S730. The request for discarding the memory system 110 may include blocking booting of the memory system 110 and blocking the read command after booting.

When the discard request is not valid (e.g., N in S720), FTL 40 may terminate the request for discarding the memory system 110.

Meanwhile, the memory system discard writing unit 146, which has received the request for discarding the memory system 110, may write discard activation of the memory system 110 by burning the e-fuse, in S740. When the e-fuse is burned and discard of the memory system 110 is activated, recovery may not be possible. Therefore, when the request for discarding the memory system 110 is to block booting of the memory system 110, the controller 130, in which the e-fuse has been burned, may block booting and all commands for the memory system 110 after the e-fuse is burned. When the request for discarding the memory system 110 is to block the read command after booting of the memory system 110, the controller 130 may block reading of data stored in the memory system 110 by cancelling a read command from the host 102, not responding to the command, or transmitting arbitrary data.

In one embodiment, the memory system discard writing unit 146 may burn different e-fuses in order to distinguish whether the memory system discard method selected by the user is a booting blocking method or a read command blocking method. In one embodiment, the memory system discard writing unit 146 may burn a common e-fuse indicating the discard of the memory system 110 and different e-fuses indicating the method of discarding the memory system 110 (e.g., indicating booting blocking or read command blocking).

As described above, the read command may include the following operations: receiving a read command and a logical address of data corresponding to the read command from the host 102, transferring a physical address corresponding to the logical address of the data, requesting the memory device 150 to read data corresponding to the physical address, transferring the data stored in a location corresponding to the physical address to the controller 130, storing, by the controller 130, the data received from the memory device 150 in memory 144, and transferring the data stored in memory 144 to the host 102. When discard of the memory system 110 is activated, the memory system discard check and execution unit 148 may block the read command by cancelling or not responding to at least one of the above operations.

In one embodiment, the memory system discard check and execution unit 148 may control the host IF 132 such that the read command transferred from the host 102 is not received or is not transferred to FTL 40, or may control FTL 40 such that the physical address obtained by translating the logical address of the data received from the host 102 is not transferred to the memory I/F 142.

Furthermore, the memory system discard check and execution unit 148 may control the memory I/F 142 such that the read command and the physical address are not transferred to the memory device 150 or data received from the memory device 150 is ignored.

Furthermore, the memory system discard check and execution unit 148 may control the memory I/F 142 such that data received from the memory device 150 is not stored in the memory 144 or arbitrary data is stored therein. In such a case, the stored arbitrary data may be transferred to the host 102 through the host IF 132.

In accordance with one embodiment, the memory system discard check and execution unit 148 may control the memory 144 or the host IF 132 such that data is not transferred to the host 102.

After the e-fuse is burned, the memory system discard check and execution unit 148 may determine whether to cancel or ignore the read command by checking whether the e-fuse has been burned.

Furthermore, based on the request for discarding the memory system 110, the memory device 150 may verify whether the discard request is valid, in S750. The memory device 150 may verify the validity of the discard request, for example, based on the method used in FTL 40. When the discard request is valid (e.g., Y in S750), for example, when the serial number of the memory system 110 is included in the discard request, the memory device 150 may write (i.e., register) discard activation of the memory system 110 in the OTP memory such as a register, in S760. When the discard request is not valid (e.g., N in S750), for example, when the serial number of the memory system 110 is not included in the discard request, the memory device 150 may terminate the request for discarding the memory system 110.

The memory system discard writing unit 146 has been described as performing the process of discarding the memory system 110. However, in one embodiment, the controller 130 may operations corresponding to discard of the memory system 110. When the host IF 132 performs the user authentication and verifies validity of the discard request, then when authentication and verification are completed the discard request may be transferred to the memory system discard writing unit 146, and the memory device 150 or the HOST IF 132 may perform only the user authentication operation. The host IF 132 may request the FTL 40 to discard the memory system 110, such that FTL transfers the discard request to the memory system discard writing unit 146 and the memory device 150.

Figure 9:
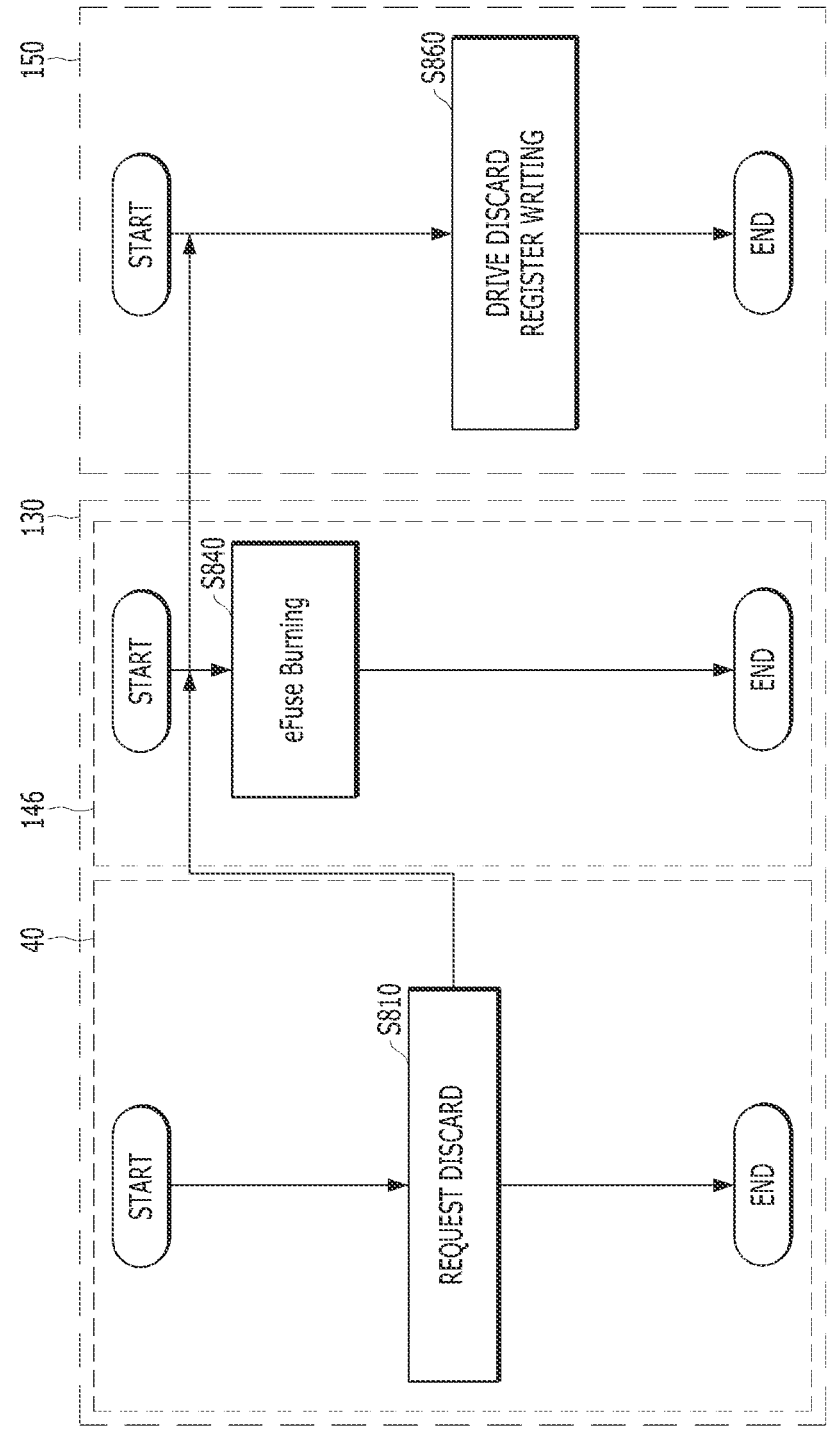
FIG. 9 illustrates an embodiment of a process to discard the memory system.

FIG. 9 is a flowchart illustrating an embodiment of a method of discarding the memory system 110 including the memory device 150 once having reached its end of life (EOL). When the memory device 150 reaches its end of life (e.g., a state in which data is neither writable nor deletable), a data deletion-related command such as format or sanitize may not be processed because a command from host 102 may not be executed. Therefore, a state in which data is not deleted may persist and data may be leaked.

Referring to FIG. 9, in 810, the FTL 40 may receive a data delete command from the HOST 102 and may transfer a request for discarding the memory system 110 to the memory system discard writing unit 146 and memory device 150. The data delete command may include data deletion (e.g., format, sanitize, and secure erase, or an initialization) command for the memory device 150.

The FTL 40 may check whether the memory device 150 is able to execute the data delete command. The FTL 40 may check whether the memory device 150 has reached a life expiration state (e.g., EOL). When it is determined that the memory device 150 has reached its EOL and is not able to execute the data delete command, the FTL 40 may transfer the data delete command from the host 102 to the memory system discard writing unit 146 and memory device 150.

In 840, after receiving the data delete command, the memory system discard writing unit 146 may write the discard activation of the memory system 110 by burning the e-fuse. As described, when the discard activation of the memory system 110 is written, all read commands for the memory system 110 may be blocked. As in the case of booting blocking or read command blocking, a common e-fuse indicating the discard of the memory system 110 and an e-fuse indicating the read command blocking may be burned, or the e-fuse indicating read command blocking (different form an e-fuse indicating booting blocking) may be burned.

In 860, after receiving the data delete command, the memory device 150 may write discard activation of the memory system 110 in the OTP memory, e.g., a register.

In operations 840 and 860 after discard activation of the memory system 110, booting of the memory system 110 may be blocked or the read command after booting may be blocked, for example, as described with reference to FIG. 8.

In one embodiment, when the memory device 150 has reached its EOL, it may not be possible to directly delete data of the memory device 150. However, the controller 130 or memory device 150 may write discard activation of the memory system 110 to block reading of data of the memory device 150. As a result, data leakage can be substantially prevented.

FIGS. 10 to 18 illustrate embodiments of data processing systems and electronic devices to which memory system 110 of FIGS. 1 to 9 (with memory device 150 and controller 130) may be applied.

Figure 10:
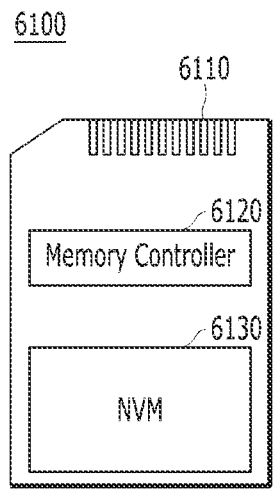
FIG. 10 illustrates an embodiment of a data processing system.

FIG. 10 is a diagram schematically illustrating an embodiment of a data processing system including a memory system. In this embodiment, the data processing system may include a memory card system 6100 to which the memory system is applied.

Referring to FIG. 10, the memory card system 6100 may include a memory controller 6120, a memory device 6130 and a connector 6110. The memory controller 6120 may be electrically connected to, and configured to access, memory device 6130, which, for example, may include a nonvolatile memory. In one embodiment, the memory controller 6120 may be configured to control read, write, erase and background operations of the memory device 6130. The memory controller 6120 may be configured to serve as an interface between the memory device 6130 and a host, and may execute instructions (e.g., firmware) for controlling the memory device 6130. The memory controller 6120 may correspond, for example, to controller 130 of the memory system 110 described with reference to FIG. 1. Also, the memory device 6130 may correspond, for example, to memory device 150 of memory system 110 described with reference to FIG. 1.

The memory controller 6120 may include, for example, a RAM, a processor, a host interface, a memory interface and an error correction component. The memory controller 6120 may communicate with an external device (e.g., host 102 of FIG. 1) through connector 6110. As described with reference to FIG. 1, memory controller 6120 may be configured to communicate with an external device through one or more of various communication protocols. Examples include universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. The memory system and the data processing system may therefore be applied to wired/wireless electronic devices, including mobile electronic devices, in some embodiments.

The memory device 6130 may be implemented by a nonvolatile memory. Examples include an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

In one embodiment, the memory controller 6120 and memory device 6130 may be integrated into a single semiconductor device to form a solid-state driver (SSD). In one embodiment, the memory controller 6120 and memory device 6130 may be integrated to form a memory card, e.g., a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 11:
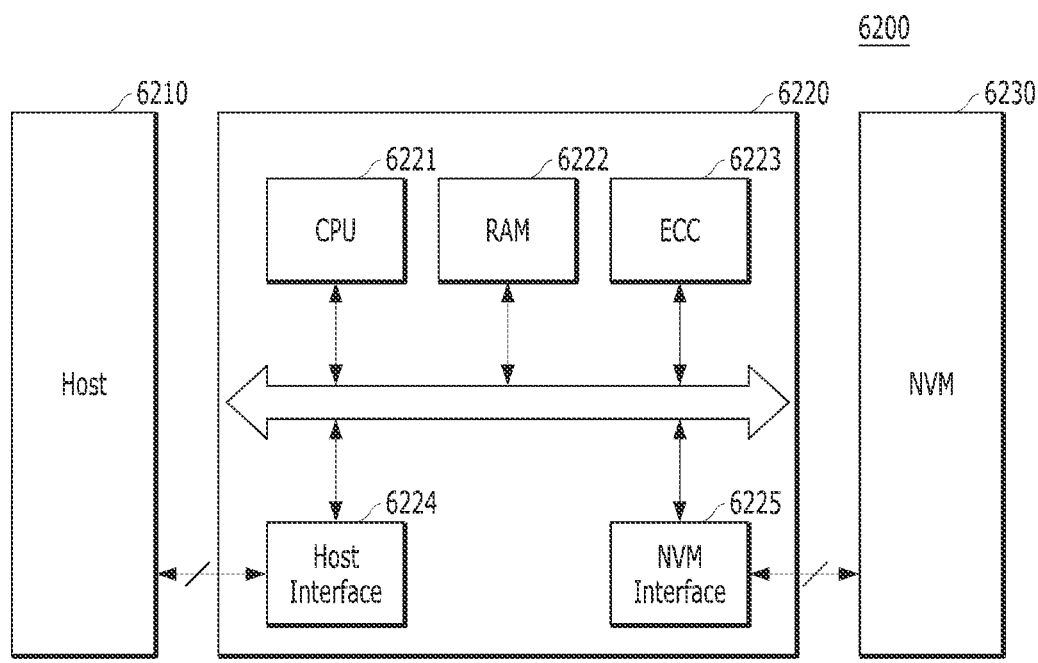
FIG. 11 illustrates an embodiment of a data processing system.

FIG. 11 is a diagram schematically illustrating an embodiment of a data processing system 6200 including a memory system. The data processing system 6200 may include a memory device 6230 having one or more nonvolatile memories and a memory controller 6220 for controlling the memory device 6230. The data processing system 6200 of FIG. 9 may serve as a storage medium such as a memory card (CF, SD, micro-SD or the like) or USB device as described with reference to FIG. 1. The memory device 6230 may correspond to the memory device 150 in the memory system 110 as illustrated in FIG. 1, and the memory controller 6220 may correspond to the controller 130 in the memory system 110 as illustrated in FIG. 1.

The memory controller 6220 may control a read, write or erase operation on the memory device 6230 in response to a request of the host 6210. The memory controller 6220 may include one or more processors (e.g., CPUs) 6221, a buffer memory such as RAM 6222, an ECC circuit 6223, a host interface 6224 and a memory interface such as an NVM interface 6225.

The CPU 6221 may control overall operation on the memory device 6230, for example, read, write, file system management and bad page management operations. The RAM 6222 may be operated according to control of the CPU 6221 and may be used as a work memory, buffer memory, or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the memory device 6230 to operate at high speed.

The ECC circuit 6223 may generate an ECC (Error Correction Code) for correcting a failed bit or error bit of data from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data output from the memory device 6230. The ECC circuit 6223 may correct an error using the parity bit. The ECC circuit 6223 may correct an error using, for example, an LDPC code, BCH code, turbo code, Reed-Solomon code, convolution code, RSC or using coded modulation such as TCM or BCM.

The memory controller 6220 may exchange data with the host 6210 through the host interface 6224. The memory controller 6220 may exchange data with the memory device 6230 through the NVM interface 6225. The host interface 6224 may be connected to the host 6210 through, for example, a PATA bus, a SATA bus, a SCSI, an USB, a PCIe or a NAND interface. The memory controller 6220 may have a wireless communication function with a mobile communication protocol, e.g., WiFi or Long Term Evolution (LTE).

The memory controller 6220 may be connected to an external device, for example, the host 6210 or another external device and then may exchange data with the external device. For example, because the memory controller 6220 is configured to communicate with the external device according to one or more of various communication protocols, the memory system and the data processing system may be applied to various wired and/or wireless electronic devices, including a mobile electronic device.

Figure 12:
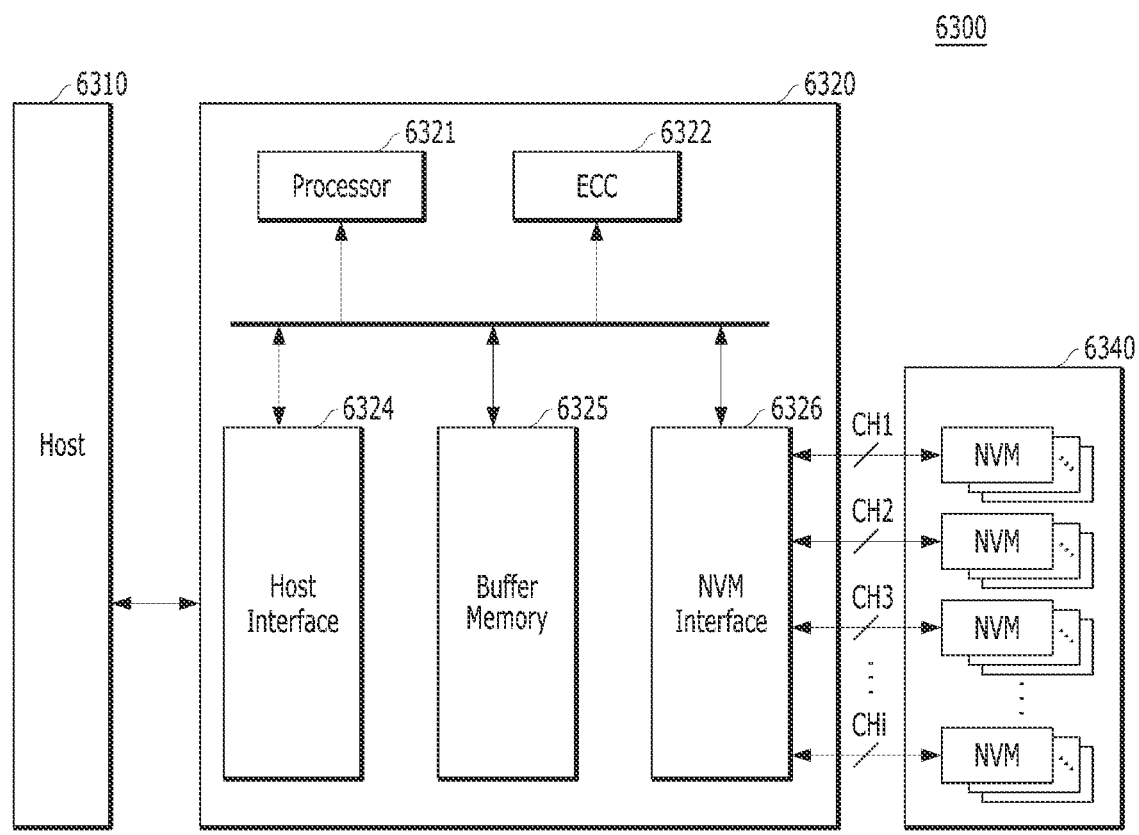
FIG. 12 illustrates an embodiment of a data processing system.

FIG. 12 is a diagram schematically illustrating an embodiment of a data processing system including a memory system. In this embodiment, the data processing system includes an SSD 6300 to which the memory system may be applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

The controller 6320 may be connected to the memory device 6340, for example, through one or more channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data from the host 6310 or data from a plurality of flash memories NVM in the memory device 6340. Further, the buffer memory 6325 may temporarily store meta data of the plurality of flash memories NVM, for example, map data including a mapping table. The buffer memory 6325 may be embodied by any of a variety of volatile memories (e.g., DRAM, SDRAM, DDR SDRAM, LPDDR SDRAM, GRAM, etc.) or nonvolatile memories (e.g., FRAM, ReRAM, STT-MRAM, PRAM, etc.). FIG. 10 illustrates that the buffer memory 6325 is embodied in the controller 6320. However, the buffer memory 6325 may be external and coupled to the controller 6320 in some embodiments.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device (e.g., host 6310), and nonvolatile memory interface 6326 may provide an interface function with the memory device 6340 connected through one or more channels.

Furthermore, a plurality of SSDs 6300 (to which the memory system 110 of FIG. 1 is applied) may be provided to embody a data processing system, e.g., a Redundant Array of Independent Disks (RAID) system. The RAID system may include the SSDs 6300 and a RAID controller for controlling the SSDs 6300. When the RAID controller performs a program operation in response to a write command from the host 6310, the RAID controller may select one or more memory systems or SSDs 6300 according to a plurality of RAID levels (e.g., RAID level information) of the write command from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels (e.g., RAID level information) of the read command from the host 6310 in the SSDs 6300, and may provide data read from the selected SSDs 6300 to the host 6310.

Figure 13:
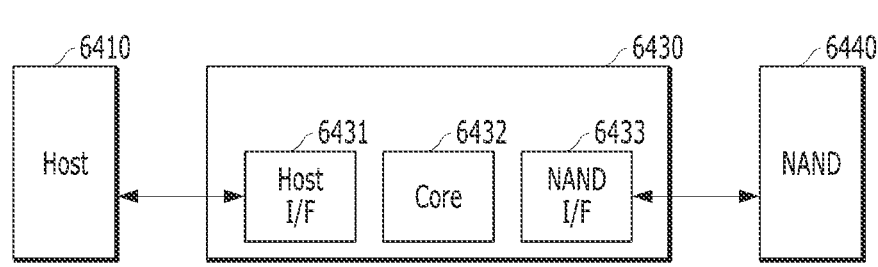
FIG. 13 illustrates an embodiment of a data processing system.

FIG. 13 is a diagram schematically illustrating an embodiment of a data processing system including a memory system. In this embodiment, the data processing system includes an embedded Multi-Media Card (eMMC) 6400 to which the memory system may be applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to memory device 150 in memory system 110 of FIG. 1.

The controller 6430 may be connected to the memory device 6440 through one or more channels. The controller 6430 may include one or more cores 6432, a host interface 6431 and a memory interface, e.g., a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface (e.g., MMC interface) as described with reference to FIG. 1. Furthermore, the host interface 6431 may serve as a serial interface, e.g., UHS ((Ultra High Speed)-I/UHS-II) interface.

FIGS. 14 to 17 are diagrams schematically illustrating additional embodiments of a data processing system including a memory system. In these embodiments, the data processing system includes Universal Flash Storage (UFS) systems to which the memory system may be applied.

Referring to FIGS. 14 to 17, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired and/or wireless electronic devices (e.g., a mobile electronic devices). The UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices (e.g., wired and/or wireless electronic devices such as mobile electronic devices) through one or more UFS protocols. The UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 11 to 13. The UFS cards 6530, 6630, 6730, 6830 may be embodied in the form of the memory card system 6100 described with reference to FIG. 10.

In the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, e.g., MIPI M-PHY and MIPI UniPro (Unified Protocol) in MIPI (Mobile Industry Processor Interface). The UFS devices 6520, 6620, 6720, 6820 and the UFS cards 6530, 6630, 6730, 6830 may communicate with each other through various protocols other than the UFS protocol. Examples include UFDs, MMC, SD, mini-SD, and micro-SD.

Figure 14:
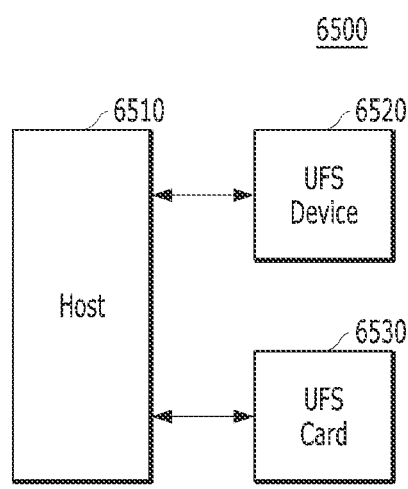
FIGS. 14 to 17 illustrating additional embodiments of a data processing system.

In the UFS system 6500 illustrated in FIG. 14, each of the host 6510, UFS device 6520 and UFS card 6530 may include, for example, UniPro. The host 6510 may perform a switching operation to communicate with the UFS device 6520 and UFS card 6530. For example, host 6510 may communicate with the UFS device 6520 or UFS card 6530 through link layer switching, e.g., L3 switching at the UniPro. The UFS device 6520 and the UFS card 6530 may communicate with each other through link layer switching at the UniPro of host 6510.

In one embodiment, one UFS device 6520 and one UFS card 6530 are connected to the host 6510. In one embodiment, a plurality of UFS devices and UFS cards may be connected in parallel or in a predetermined form (e.g., a star) to the host 6410. A star formation may include an arrangement in which a single device is coupled with plural devices for centralized operation. A plurality of UFS cards may be connected in parallel or in a predetermined form to the UFS device 6520 or may be connected in series or in a chain to the UFS device 6520.

Figure 15:
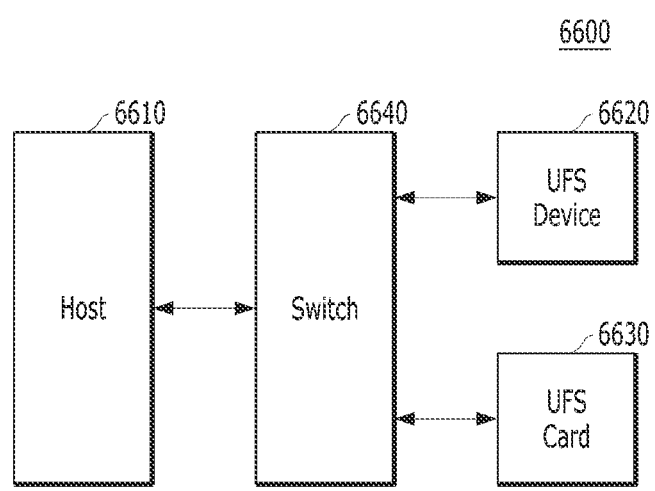

In the UFS system 6600 illustrated in FIG. 15, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In one embodiment, one UFS device 6620 and one UFS card 6630 are connected to the switching module 6640. However, a plurality of UFS devices and UFS cards may be connected in parallel or in the predetermined form (e.g., a star) to the switching module 6640. A plurality of UFS cards may be connected in series or in the form of a chain to the UFS device 6620.

Figure 16:
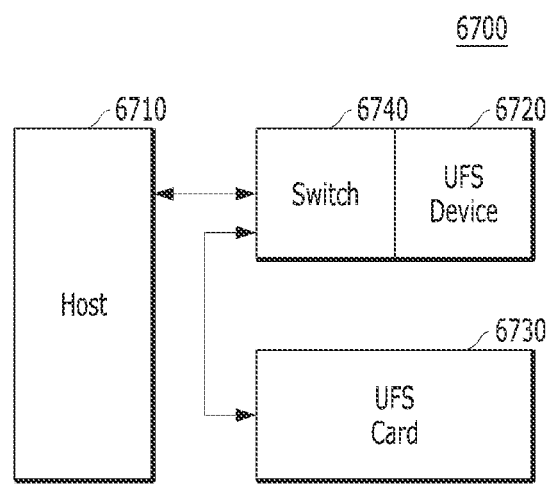

In the UFS system 6700 illustrated in FIG. 16, each of the host 6710, UFS device 6720 and UFS card 6730 may include, for example, UniPro. The host 6710 may communicate with the UFS device 6720 or UFS card 6730 through a switching module 6740, which, for example, may perform a switching operation through the switching module 6740 which performs link layer switching at the UniPro, for example, L3 switching. The UFS device 6720 and UFS card 6730 may communicate with each other through link layer switching of the switching module 6740 at the UniPro. The switching module 6740 may be integrated as one module with the UFS device 6720 inside or outside the UFS device 6720. In an embodiment, one UFS device 6720 and one UFS card 6730 are connected to the switching module 6740. However, a plurality of modules, each including the switching module 6740 and UFS device 6720, may be connected in parallel or in a predetermined form (e.g., a star) to the host 6710 in another embodiment. In one example, a plurality of modules may be connected in series or in the form of a chain to each other. Furthermore, a plurality of UFS cards may be connected in parallel or in the predetermined form (e.g., star) to UFS device 6720.

Figure 17:
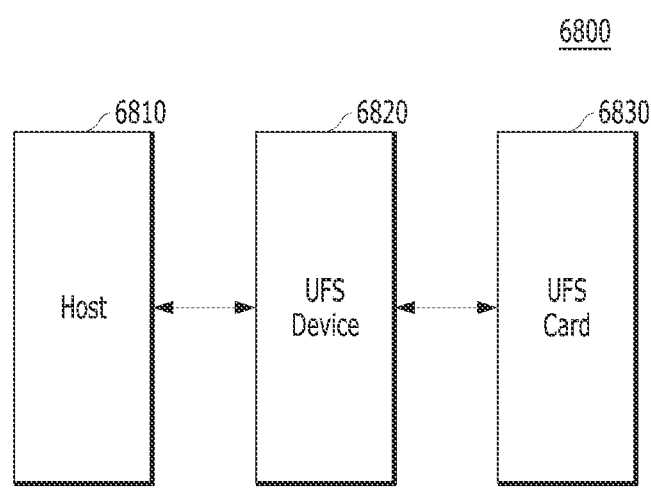

In the UFS system 6800 illustrated in FIG. 17, each of the host 6810, UFS device 6820 and UFS card 6830 may include M-PHY and UniPro. The UFS device 6820 may perform a switching operation to communicate with the host 6810 and UFS card 6830. For example, the UFS device 6820 may communicate with the 6810 or UFS card 6830 through a switching operation between the M-PHY and UniPro module for communication with the host 6810 and M-PHY and UniPro module for communication with the UFS card 6830, for example, through a target ID (Identifier) switching operation.

The host 6810 and UFS card 6830 may communicate with each other through target ID switching between the M-PHY and UniPro modules of the UFS device 6820. In an embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 18:
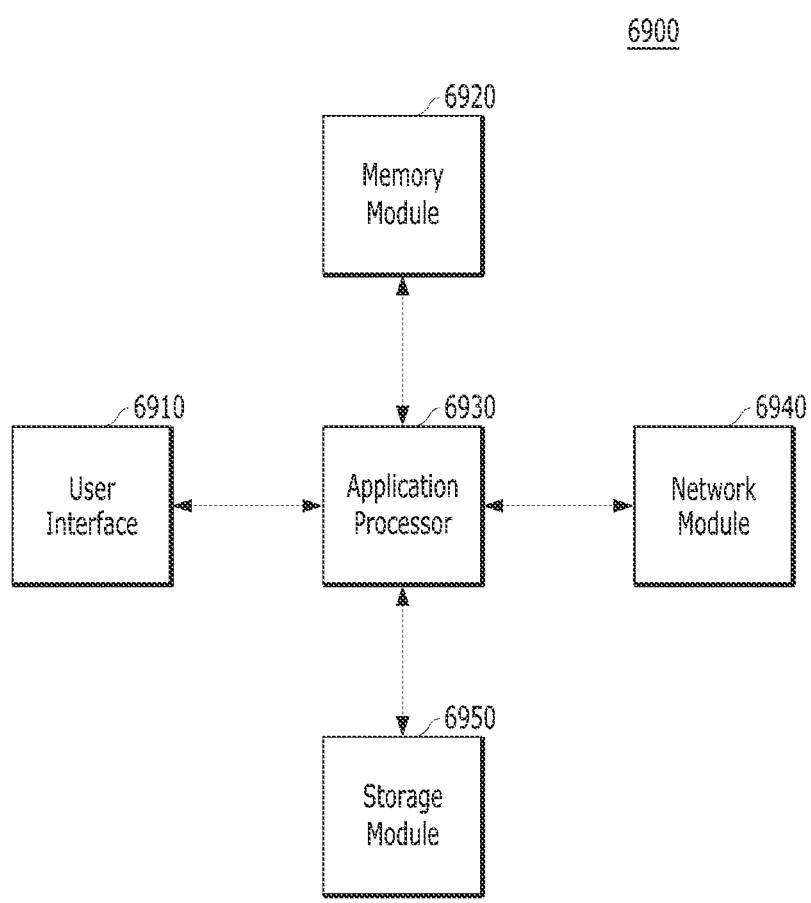
FIG. 18 illustrates an embodiment of a data processing system.

FIG. 18 is a diagram schematically illustrating an embodiment of a data processing system including a memory system in accordance. In this embodiment, the data processing system may include a user system to which the memory system may be applied.

Referring to FIG. 18, the user system 6900 may include an application processor 6930, a memory module 6920, a network module 6940, a storage module 6950 and a user interface 6910. The application processor 6930 may drive components in the user system 6900 (e.g., an operating system) and, for example, may include controllers, interfaces, and a graphic engine which control components in the user system 6900. In one embodiment, the application processor 6930 may be provided as System-on-Chip (SoC).

The memory module 6920 may be used as a main memory, work memory, buffer memory or cache memory of the user system 6900. Examples of the memory module 6920 include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM.

The application processor 6930 and memory module 6920 may be packaged and mounted, for example, based on POP (Package on Package).

The network module 6940 may communicate with one or more external devices. For example, the network module 6940 not only may support wired communication, but also may support various wireless communication protocols. Examples include code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, in accordance with one or more embodiments, the memory system and the data processing system can be applied to wired and/or wireless electronic devices. Network module 6940 may be included, for example, in application processor 6930.

The storage module 6950 may store data received, for example, from the application processor 6930 and then may transmit the stored data to the application processor 6930. The storage module 6950 may include a nonvolatile semiconductor memory device (e.g., phase-change RAM (PRAM), magnetic RAM (MRAM), resistive RAM (Re-RAM), NAND flash, NOR flash, 3D NAND flash) and may be provided as a removable storage medium such as a memory card or external drive of the user system 6900. The storage module 6950 may correspond to memory system 110 as described with reference to FIG. 1. Furthermore, the storage module 6950 may be embodied as an SSD, an eMMC and an UFS as described with reference to FIGS. 12 to 17.

The user interface 6910 may include one or more interfaces for inputting data or commands to the application processor 6930 and/or outputting data to an external device. For example, the user interface 6910 may include one or more user input interfaces such as a keyboard, a keypad, a button, a touch panel, a touch screen, a touch pad, a touch ball, a camera, a microphone, a gyroscope sensor, a vibration sensor and a piezoelectric element. The user interface 6910 may include one or more user output interfaces such as a liquid crystal display (LCD), an organic light emitting diode (OLED) display device, an active matrix OLED (AMO-LED) display device, an LED, a speaker and a motor.

When the memory system 110 of FIG. 1 is applied to a mobile electronic device of the user system 6900, the application processor 6930 may control overall operation of the mobile electronic device, and the network module 6940 may serve as a communication module for controlling wired and/or wireless communication with an external device. The user interface 6910 may display data processed by the processor 6930 on a display/touch module of the mobile electronic device or may support a function of receiving data from the touch panel.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, managers, cores, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, the memory system can efficiently program data to the memory device without an additional command.

Although various embodiments have been described for illustrative purposes, it will be apparent to those skilled in the art that various changes and modifications may be made without departing from the spirit and scope of the invention as defined in the following claims. The embodiments may be combined to form additional embodiments.

What is claimed is:

1. A memory system comprising:
a controller configured to authenticate a user who inputs a request for discarding the memory system, to verify whether the request is valid when the user is authenticated as a legitimate user, to register discard activation of the memory system when the request is valid, and to transmit the request to a memory device; and
the memory device configured to determine whether the transmitted request is valid, and to register the discard activation of the memory system when the request is valid,
wherein the controller is configured to register the discard activation of the memory system by burning at least one electronic fuse, and
wherein the at least one electronic fuse includes:
a common electronic fuse indicating whether the memory system is discarded; and
an electronic fuse indicating a method of discarding the memory system.

2. The memory system of claim 1, wherein, when the request includes blocking booting, the controller is configured to block booting of the memory system after registering of the discard activation of the memory system.

3. The memory system of claim 1, wherein, when the request includes blocking a read command after booting and the discard activation of the memory system is registered, the controller is configured to block the read command for the memory system after booting of the memory system.

4. The memory system of claim 1, wherein, when the discard activation of the memory system is registered, the controller or the memory device is configured not to respond to a read command input to the controller or the memory device, or to cancel the read command.

5. The memory system of claim 1, wherein the memory device is configured to register the discard activation of the memory system in a register.

6. The memory system of claim 5, wherein the register includes a one-time programmable (OTP) memory.

7. The memory system of claim 1, wherein the controller is configured to cancel or not to respond to at least one of the following based on a read command:
receive a read command and a logical address of data corresponding to the read command from a host,
transfer a physical address corresponding to the logical address of the data,
request the memory device to read data corresponding to the physical address,
transfer the data stored in a location corresponding to the physical address to the controller,
store the data received from the memory device in a memory, and
transfer the data to the host.

8. A method of discarding a memory system, the method comprising:
authenticating, by a controller, a user who inputs a request for discarding the memory system;
verifying, by the controller, whether the request is valid when the user is authenticated as a legitimate user;

registering, by the controller, discard activation of the memory system when the request is valid and transmitting the request to a memory device; and determining, by the memory device, whether the transmitted request is valid; and registering, by the memory device, the discard activation of the memory system when the request is valid, wherein registering the discard activation of the memory system includes burning at least one electronic fuse, and wherein the at least one electronic fuse includes:
    a common electronic fuse indicating discard of the memory system; and
    an electronic fuse indicating a method of discarding the memory system.

9. The method of claim 8, wherein, when the request includes blocking booting, booting of the memory system is blocked after the discard activation of the memory system is registered.

10. The method of claim 8, wherein, when the request includes blocking a read command after booting, and the discard activation of the memory system is registered, the read command for the memory system is blocked after booting of the memory system.

11. The method of claim 8, wherein, when the discard activation of the memory system is registered, the method includes providing no response to a read command input to the controller or the memory device or canceling the read command.

12. The method of claim 8, wherein registering, by the memory device, the discard activation of the memory system is performed in a register.

13. The method of claim 12, wherein the register includes a one-time programmable (OTP) memory.

14. The method of claim 8, further comprising canceling or not providing a response to at least one of the following:
    receiving a read command and a logical address of data corresponding to the read command from a host,
    transferring a physical address corresponding to the logical address of the data,
    requesting the memory device to read data corresponding to the physical address,
    transferring the data stored in a location corresponding to the physical address to the controller,
    storing the data received from the memory device in a memory, and
    transferring the data to the host.

15. A method of discarding a memory system including a controller and a memory device, the method comprising:
    receiving, by the controller, a delete command for data of the memory device;
    checking, by the controller, whether the memory device is able to execute the delete command; and
    registering discard activation of the memory system when the memory device reaches end of life and is not able to execute the delete command,
    wherein registering the discard activation of the memory system includes burning at least one electronic fuse, and
    wherein the at least one electronic fuse includes:
        a common electronic fuse indicating discard of the memory system; and
        an electronic fuse indicating a method of discarding the memory system.

\* \* \* \* \*